(12) United States Patent
Hasegawa et al.

(10) Patent No.: US 10,986,003 B2
(45) Date of Patent: *Apr. 20, 2021

(54) VISUALIZATION OF ANALYSIS RESULTS OF CONTENTS

(71) Applicant: International Business Machines Corporation, Armonk, NY (US)

(72) Inventors: Mihoko Hasegawa, Tokyo (JP); Kensuke Matsuoka, Chiba (JP); Asako Ono, Tokyo (JP); Lianzi Wen, Takatsu-Ku (JP)

(73) Assignee: International Business Machines Corporation, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/294,257

(22) Filed: Mar. 6, 2019

(65) Prior Publication Data

US 2019/0207831 A1 Jul. 4, 2019

Related U.S. Application Data

(63) Continuation of application No. 15/877,656, filed on Jan. 23, 2018, now Pat. No. 10,333,804, which is a
(Continued)

(51) Int. Cl.
*H04L 12/26* (2006.01)
*G06T 11/20* (2006.01)
(Continued)

(52) U.S. Cl.
CPC .......... *H04L 43/045* (2013.01); *G06T 11/206* (2013.01); *H04L 51/063* (2013.01);
(Continued)

(58) Field of Classification Search
CPC ..... H04L 43/045; H04L 51/10; H04L 51/063; G06T 11/206; G06F 3/04817
See application file for complete search history.

(56) References Cited

U.S. PATENT DOCUMENTS 5,850,206 A * 12/1998 Kashiwagi .............. G06T 17/00
345/418
9,317,574 B1 4/2016 Brisebois et al.
(Continued)

OTHER PUBLICATIONS

Office Action for U.S. Appl. No. 16/294,042 dated Mar. 3, 2020, pp. 1-47.
(Continued)

*Primary Examiner* — Seth A Silverman
(74) *Attorney, Agent, or Firm* — Winstead PC

(57) ABSTRACT

A method, system and computer program product for visualizing analysis results of contents. Contents collected from various kinds of communication tools are read into memory. The contents are analyzed to obtain analysis results, where the analysis results include information on user groups, information on topics and degrees of involvement of users with the topic. Furthermore, user objects assigned according to the degree of involvement are dynamically displayed for a designated period of time and for each topic using the analysis results, where the displaying of each of the user objects is modified according to the degree of involvement and the information on a user group. A communication volume object which represents a communication volume between users may be further displayed between the user objects associated with these users and displayed so as to be different depending on the communication volume.

10 Claims, 23 Drawing Sheets

Related U.S. Application Data continuation of application No. 15/378,302, filed on Dec. 14, 2016, now Pat. No. 10,320,631.

(51) Int. Cl.
*H04L 12/58* (2006.01)
*G06F 3/0481* (2013.01)
*G06F 3/0482* (2013.01)

(52) U.S. Cl.
CPC ............ *H04L 51/10* (2013.01); *G06F 3/0482* (2013.01); *G06F 3/04817* (2013.01)

(56) References Cited

U.S. PATENT DOCUMENTS

| | | | | |
|---|---|---|---|---|
| 2003/0158855 | A1* | 8/2003 | Farnham | G06F 3/0481 |
| 2010/0235771 | A1* | 9/2010 | Gregg, III | G06T 11/206 |
| | | | | 715/769 |
| 2012/0191504 | A1* | 7/2012 | Parikh | G06Q 30/0201 |
| | | | | 705/7.29 |
| 2014/0297765 | A1 | 10/2014 | Beckley et al. | |
| 2015/0046233 | A1 | 2/2015 | Srulowitz et al. | |
| 2016/0012121 | A1* | 1/2016 | Skarin | G06Q 10/10 |
| | | | | 707/736 |
| 2016/0105338 | A1* | 4/2016 | Fletcher | H04L 43/16 |
| | | | | 709/224 |

OTHER PUBLICATIONS

Assaf Ben-David, "'Don't Forget Bob' and 'Got the Wrong Bob?' Graduate from Labs," Apr. 13, 2011, pp. 1-3.

List of IBM Patents or Patent Applications Treated as Related, Mar. 6, 2019, pp. 1-2.

\* cited by examiner

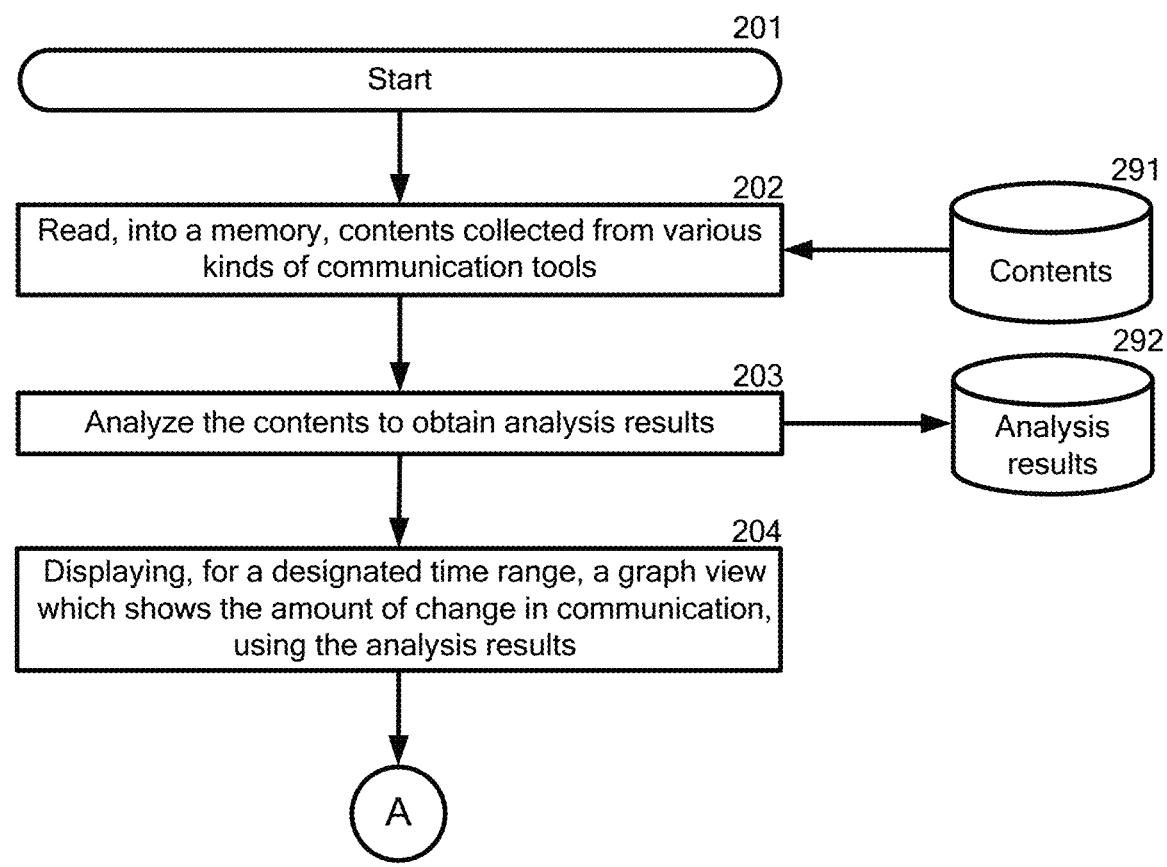

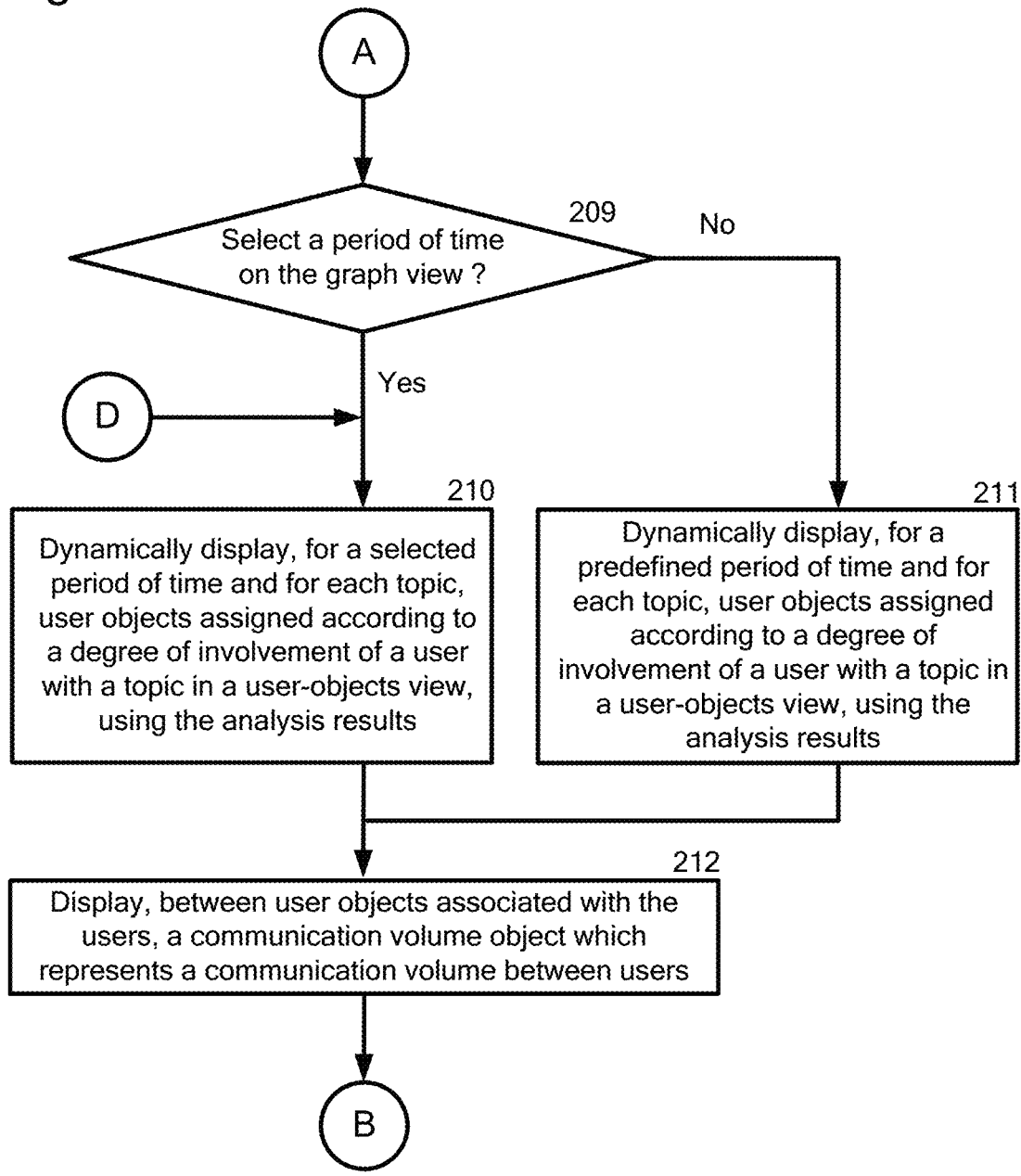

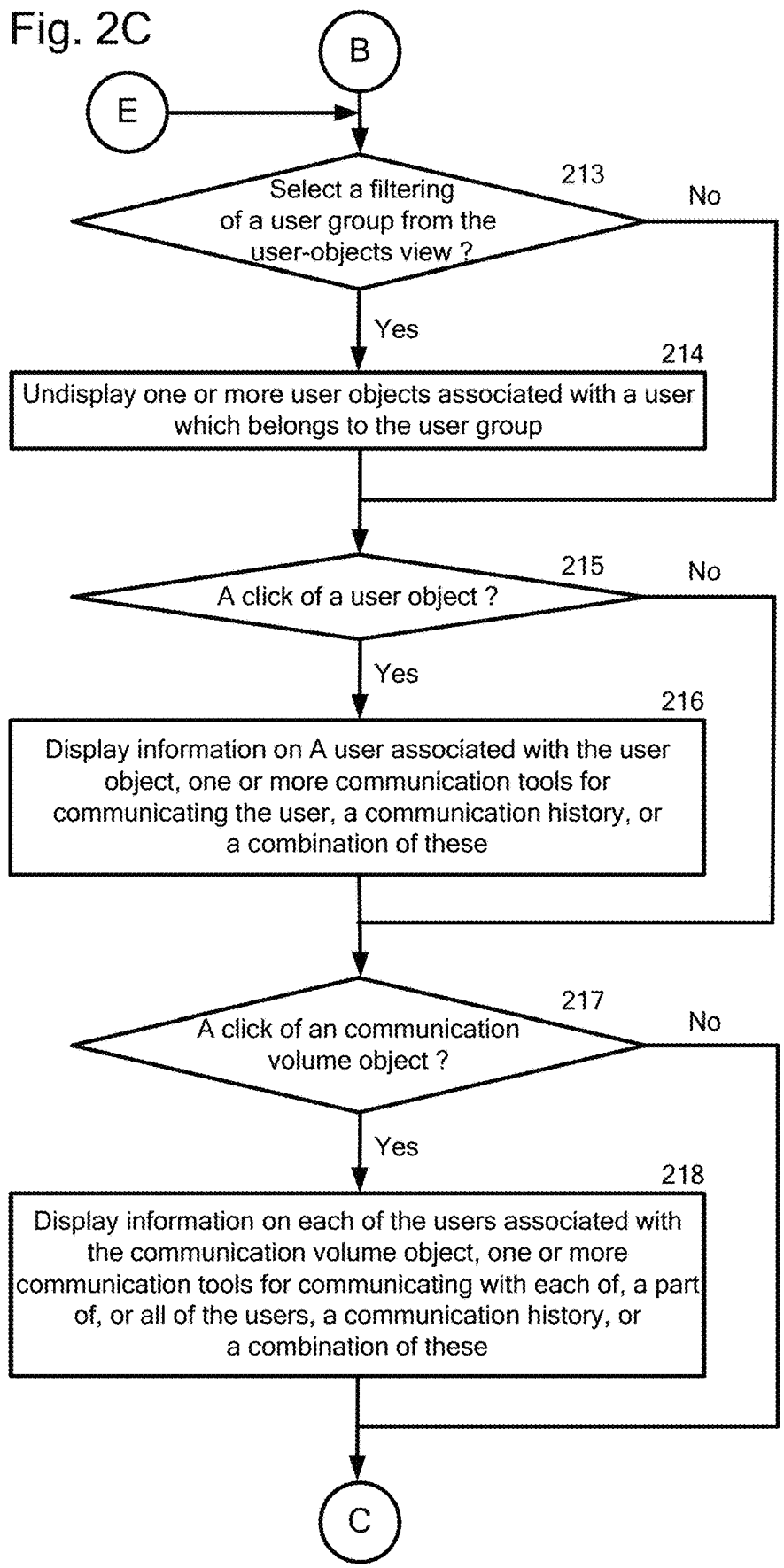

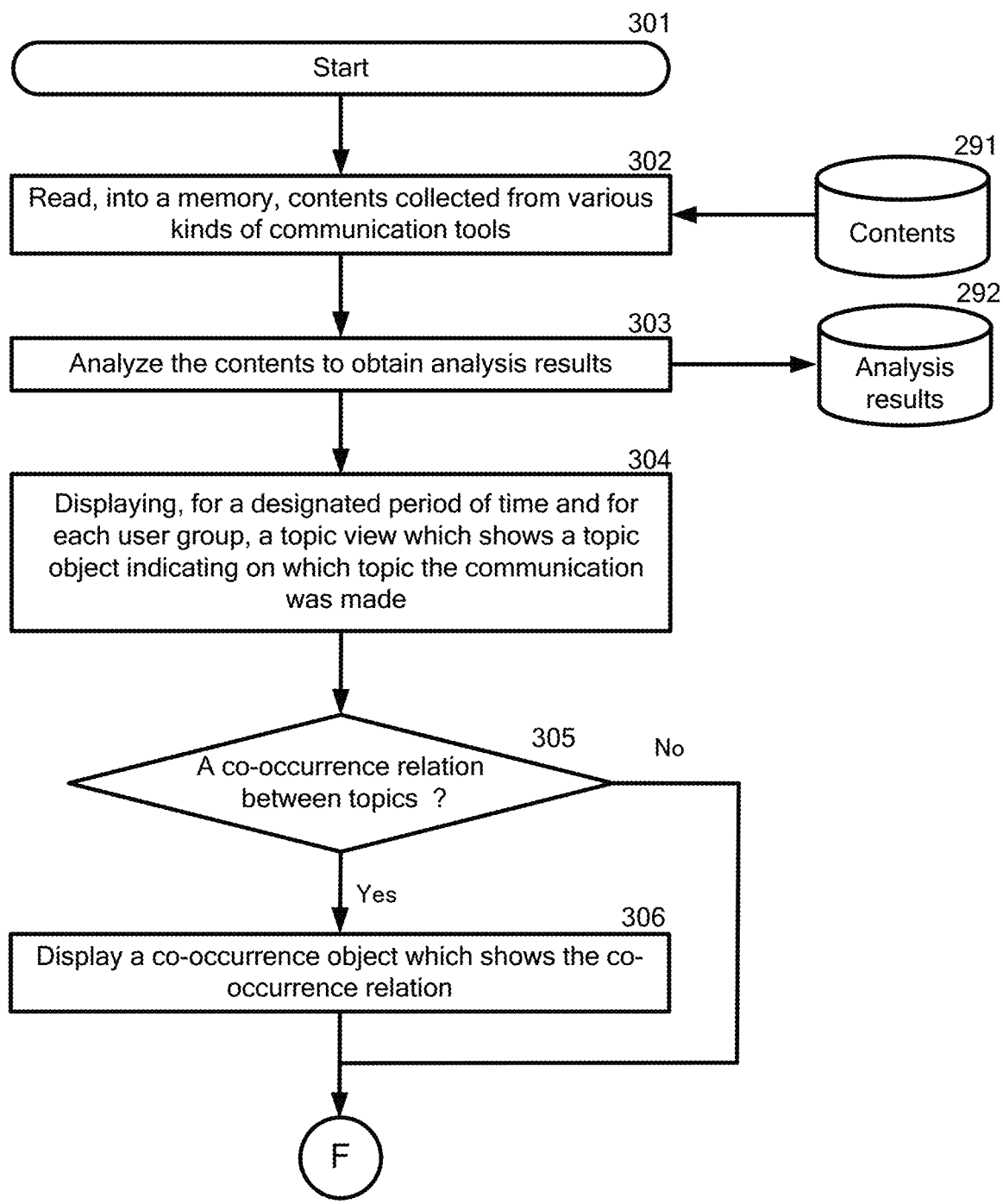

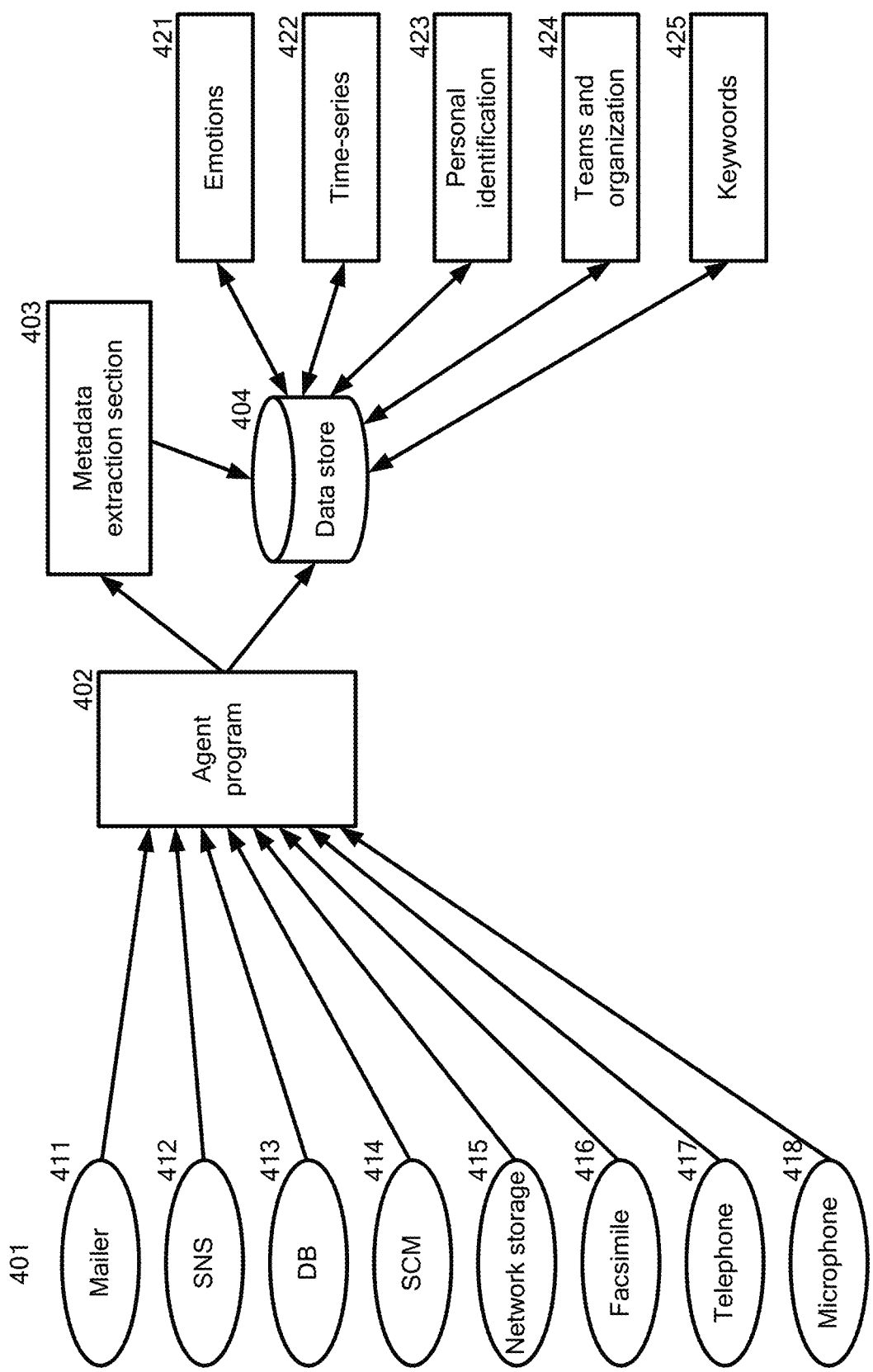

Fig. 10

| | Availability | Historical performance | Urgent degree =High | Number >5 | Sum(/Product) |
|---|---|---|---|---|---|
| Verse | 1 | 0.4 | 0.2 | 1 | 2.6(/0.08) |
| Notes Client | 0.1 | 0.1 | 0.2 | 1 | 1.4(/0.002) |
| Sametime | 1 | 0.2 | 1 | 0.2 | 1.5(/0.04) |
| Slack | 0.1 | 0.2 | 1 | 1 | 2.3(/0.02) |
| RTC | 0.1 | 0.1 | 0.2 | 0.6 | 1.0(/0.0012) |

VISUALIZATION OF ANALYSIS RESULTS OF CONTENTS

TECHNICAL FIELD

The present invention relates generally to a visualization of analysis results of contents, and more particularly to a visualization of analysis results of contents collected from various kinds of communication tools.

BACKGROUND

The opportunity of working with a plurality of users in multiple locations and different time zones are recently increased. In such a case, miscommunications sometimes happen between users in a team, group, company or organization. Further, it is sometimes hard to catch up on trending topics around the world.

SUMMARY

In one embodiment of the present invention, a method for visualizing analysis results of contents comprises reading, into a memory, contents collected from communication tools. The method further comprises analyzing the contents to obtain analysis results, where the analysis results comprise information on user groups, information on topics and degrees of involvement of users with the topic. The method additionally comprises displaying for a designated period of time a graph view which shows an amount of change in communication using the analysis results.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIGS. 2A to 2D illustrate one embodiment of a flowchart of a process for visualizing analysis results of contents collected from various kinds of communication tools;

FIGS. 3A to 3D illustrate another embodiment of a flowchart of a process for visualizing analysis results of contents collected from various kinds of communication tools;

FIG. 4A illustrates an embodiment of collecting contents from various kinds of communication tools and analyzing the contents and metadata obtained from the contents to obtain analysis results;

FIG. 10 illustrates an embodiment of calculating prioritized order of the plurality of communication tools.

DETAILED DESCRIPTION

Figure 1:
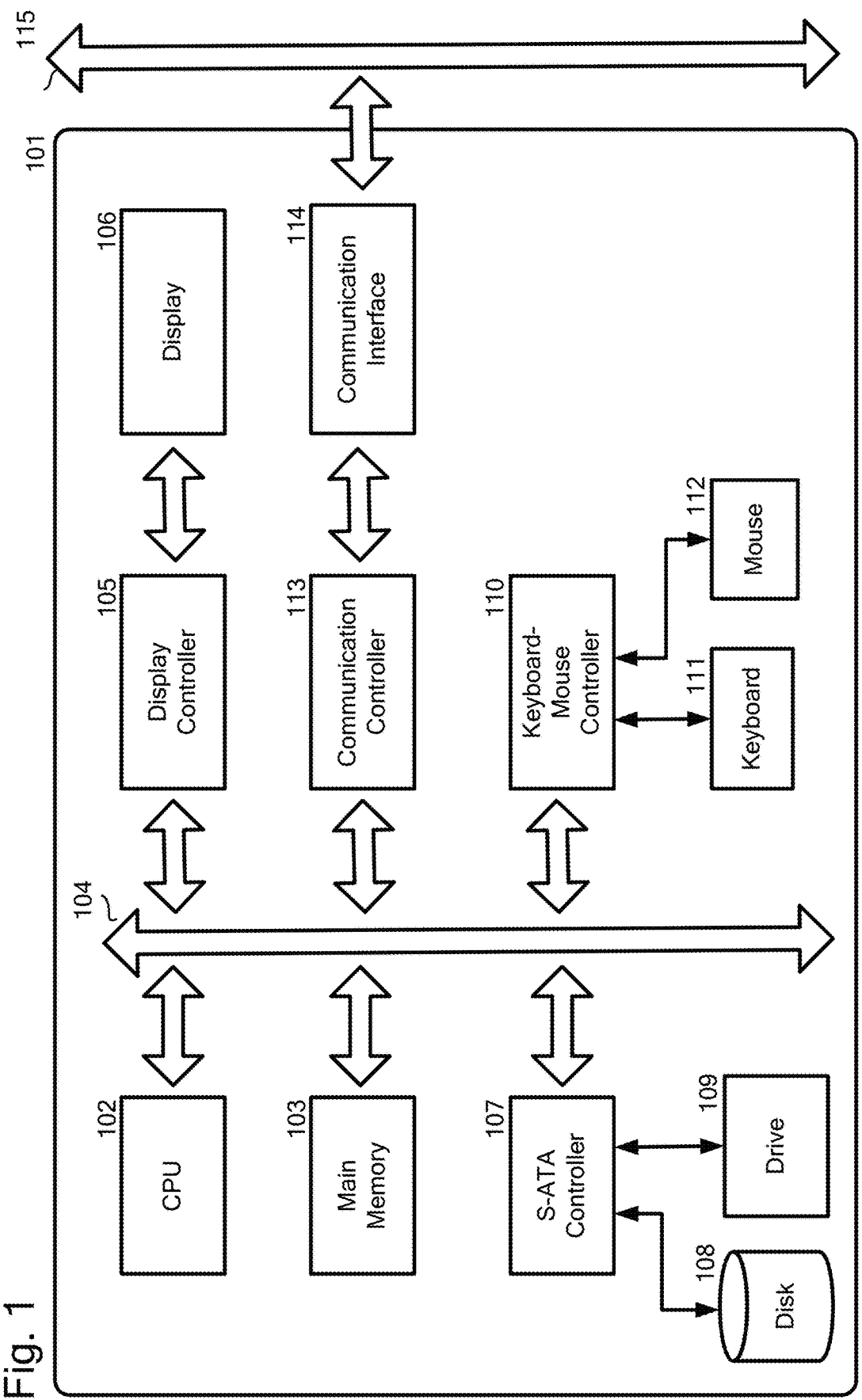
FIG. 1 illustrates an exemplified basic block diagram of a computer hardware used in an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the exemplified definitions are provided hereinafter, but the meaning of the terms should be interpreted broadly as known to the technical field to which the present invention relates.

The term, "a communication tool", may refer to, for example, but not limited to, any tool which can allow a user to communicate with one or more users.

The communication tool may comprise, for example, but not limited to, a mail software, a chat tool or messenger, a social network service (hereinafter also referred to as "SNS"), a database (hereinafter also referred to as "DB"), a source control management (hereinafter also referred to as "SCM") including a change management and a bug tracking system, a network storage, a facsimile, a telephone, and a microphone or microphone arrays.

The mail software may include, for example, but not limited to, Lotus Notes®; Microsoft Outlook®, Microsoft Outlook Express® and Windows Live Mail®.

The chat tool or messenger may include, for example, but not limited to, Facebook® FaceTime®, IBM® Sametime®, Slack® and Skype®.

The social network service may include, for example, but not limited to, Facebook®, Google+®, Instagram®, LinkedIn®, and Twitter®.

The SCM may include, for example, but not limited to, IBM® Rational Team Concert™ (hereinafter also referred to as "RTC").

The database may include, for example, but not limited to, IBM® Notes/Domino, IBM DB2®, IBM Infomix®, Microsoft® Office Access, Microsoft® SQL Server, and Oracle® Database. The database stores, for example, but not limited to, text file, image file or video file.

The network storage may include, for example, but not limited to, a network attached storage (hereinafter also referred to as "NAS") a storage provided by a server and a cloud services such as Box®, Dropbox®, Evernote®, Google® Cloud Storage, IBM® Cloud Managed Services™, and Microsoft® One Drive®.

The facsimile may include, for example, but not limited to, a dedicated facsimile machine and a printer and composite machine.

The telephone may include, for example, but not limited to, a land-line phone, a mobile phone and a satellite phone.

The term, "content", may refer to text which may consist of, for example, but not limited to, characters, numerals, symbols or a combination of these. The text may be obtained from a communication via the communication tool mentioned above.

In general, the content may include information on a group or group-related information, or information on a topic or topic-related information.

With reference now to FIG. 1, FIG. 1 illustrates an exemplified basic block diagram of a computer hardware used in an embodiment of the present invention.

A computer (101) may be, for example, but is not limited to, a desktop, laptop, notebook or server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. The display may have a touch screen or a non-touch screen. The display may be for example, but not limited to, a LCD, PDP, OEL or a projection type display. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIGS. 2A to 2D, FIGS. 3A to 3D, FIGS. 4A and 4B, FIGS. 5A to 5C, FIGS. 6A to 6C, FIGS. 7A and 7B, FIGS. 8A and 8B and FIG. 9.

The idea of an embodiment of the present invention is on the basis of the following perceptions.

Information can be scattered across various kinds of communication tools. However, it is difficult to immediately find the latest and the most important information from the information mentioned above. One of the reasons is that information mentioned above includes a lot of obsolete information. Accordingly, it is desirable to know that something has happened now.

FIGS. 2A to 2D and FIGS. 3A to 3D each illustrate one embodiment of a flowchart of a process for visualizing analysis results of contents collected from various kinds of communication tools.

The embodiment of the flowcharts will be explained by referring to FIGS. 4A and 4B, FIGS. 5A to 5C, FIGS. 6A to 6C, FIGS. 7A and 7B, FIGS. 8A and 8B and FIG. 10, as needed.

With reference now to FIGS. 2A to 2D, FIGS. 2A to 2D illustrate one embodiment of the flowchart of a process for visualizing analysis results of contents, using a graph view mentioned below.

A system such as the computer (101) performs each of the steps described in each of FIGS. 2A to 2D. The computer may be implemented as a single computer or a plurality of computers.

With reference now to FIG. 2A, in step 201, the system starts the process for summarizing a plurality of texts.

In step 202, the system reads, into a memory such as the memory (103) described in FIG. 1, contents collected from various kinds of communication tools. The contents may be in advance or continually collected from various kinds of communication tools defined above and then stored in a storage (291) which can be accessible by the system. The storage (291) may be, for example, but not limited to, an internal disk such as the disk (108) described in FIG. 1, a network attached storage (hereinafter also referred to as "NAS") or a storage in a server.

An embodiment of collecting contents from various kinds of communication tools will be explained below by referring to FIG. 4A.

With reference now to FIG. 4A, FIG. 4A illustrates an embodiment of collecting contents from various kinds of communication tools.

FIG. 4A illustrates a type of the communication tool (401) which may be used in an embodiment of the present invention. The communication tool (401) may be a mail software (411), a SNS (412), a DB (413), a SCM (414), a network storage (415), a facsimile (416), a telephone (417), and the microphone or microphone arrays (418).

In an embodiment of the present invention, an agent program (402) for enabling collection of the contents may be installed on a device where data from communication tool (401) is collected. This is because a privacy may be protected using the agent program (402). Accordingly, only in a case where the agent program (402) is installed on the device, the contents can be used for an embodiment of the present invention.

In a case where the communication tool (401) is the mail software (411) and an e-mail from the mail software (411) is received at an address associated with the agent program (402), the agent program (402) collects contents from the received e-mail. The address associated with the agent program (402) may be designated using a carbon copy header.

In a case where the communication tool (401) is the SNS (412), the agent program (402) may be installed on a server which provides a service for the SNS. Alternatively, the agent program (402) may be installed on a computer, the computer being different from a server which provides a service for the SNS, is assigned to a user ID of the SNS and collects contents on the SNS, based on the user ID to which an authorization of the collection of the contents is assigned.

In a case where the communication tool (401) is the DB (413), SCM (414) or the network storage (415), the agent program (402) is allowed to access the DB (413), SCM (414) or the network storage (415) to crawl the data stored in the DB (413), SCM (414) or the network storage (415).

In a case where the communication tool (401) is the facsimile (416), the agent program (402) may be installed a dedicated facsimile machine and a printer and composite machine and then convert facsimile data to a text using an optical character recognition technology.

In a case where the communication tool (401) is the telephone (417), the agent program (402) may join a telephone conversation such as a telephone conference and then convert voice data between or among users to a text using a speech-to-text software technology.

In a case where the communication tool (401) is the microphone or microphone arrays (418), the agent program (402) may join a conversation between or among users, for example, on-site meeting, and then convert voice data between or among the users to a text using a speech-to-text software technology.

With reference now back to FIG. 2A, in step 203, the system analyzes the contents to obtain analysis results.

The analysis may be done by first extracting metadata from the contents and then analyzing the contents and metadata using contents analysis technology such as the IBM® Watson® API or the Alchemy API.

The analysis result comprises information on user groups, information on topics and degrees of involvement of users with the topic.

A category of groups can be automatically generated, using information on a group or group-related information obtained from contents and optionally augmented manually.

A category of topics can be automatically generated, using information on a topic, topic-related information and optionally augmented manually.

The degrees of involvement of users with the topic may be calculated based on a total number of contents with which a user has an involvement. For example, the degrees of involvement of users with the topic may be calculated by extracting topics in the content, retrieving contents relating to the extracted topics and then calculating the degrees of the involvement, based on a total number of contents with which a user has an involvement. The contents to which a user has an involvement may be, for example, but not limited to, as follows:

in a case where a content is obtained from a mail, a user is a Carbon copy or Blind Carbon copy recipient of the mail (the degree of involvement may set to be "low"), a user is a recipient of the mail (the degree of involvement may set to be "middle"), or the user is a sender of the mail (the degree of involvement may set to be "high");

in a case where a content is a speech data obtained from, for example, a telephone conference, the user is a participant in the telephone conference (the degree of involvement may set to be "low"), the user is called from someone (the degree of involvement may set to be "middle"), the user is a speaker (the degree of involvement may set to be "high") or the user begins with or takes an initiative of the telephone conference (the degree of involvement may set to be "high");

in a case where a content is obtained from a SNS, a chat tool or a messenger, the user accesses the content (the degree of involvement may set to be "low"), the user makes a comment (the degree of involvement may set to be "middle"), or the user makes a return message (the degree of involvement may set to be "high");

in a case where a content is obtained from a database, the user accesses the database (the degree of involvement may set to be "low"), the user makes a comment on the content (the degree of involvement may set to be "middle"), the user is a creator of the content (the degree of involvement may set to be "high"), or the user modifies data in the database (the degree of involvement may set to be "high"); and in a case where a content is obtained from a SCM, the user is a writer of a comment (the degree of involvement may set to be "low"), the user is a reporter of a bug (the degree of involvement may set to be "middle"), or the user is a person in charge of bug fixes (the degree of involvement may set to be "high").

In a case where the degree of involvement may set to be "low", for example, a weight of "0.3" is assigned to as the degrees of the involvement. In a case where the degree of involvement may set to be "middle, for example, a weight of "0.7" is assigned to as the degrees of the involvement. In a case where the degree of involvement may set to be "high", for example, a weight of "1" is assigned to as the degrees of the involvement. The weight values may be in advance determined by an operator or administrator of the system according to an embodiment of the present invention.

The degree of involvement can be calculated using the following equation:

The degree of involvement=(a sum of the weights)/ the number of contents

In a case where there is three contents for topic A and, further, the first content is assigned to "high", the second content is assigned to "low" and the third content has no involvement, the degree of involvement can be calculate as follows, using the equation:

The degree of involvement=(1+0.3+0)/3=0.43

An embodiment of extracting metadata from the contents and analyzing the contents and metadata will be explained below by referring to FIG. 4A.

With reference now again to FIG. 4A, FIG. 4A further illustrates an embodiment of extracting metadata from the contents and analyzing the contents and metadata to obtain analysis results.

A metadata extraction section (403) extracts metadata from the contents and then stores the metadata and contents itself in a storage (404). The metadata may be, for example, but not limited to, an originator, a viewer, a task ID, date, reply to, or tags.

The analysis may be made for the following exemplified items: emotions (421), time-series (422), personal identification (423), teams and organization (424) and keywords (425).

For the emotions (421), the system annotates emotions in content, using, for example, the Alchemy API.

For the time-series (422), the system analyses access history and frequency in order to weight importance.

For the personal identification (423), the system makes a speaker recognition and a person or name normalization.

For the teams and organization (424), the system may use the time zone in order to detect a group automatically. This is because users who are working in a common time zone belong to the same group. The time information can be obtained by an information on activity time of a communication tool or information on a time of saving a content into, for example, a database, SCM or file. Therefore, the system deducts sub-teams from time zone. After then, the system calculates correspondence frequency, content similarity, and additional data from an external organizational system. The correspondence frequency may be, for example, but not limited to as the follows: in a case where a communication tool is a mail software, the correspondence frequency may be a time from a receipt of a mail to a replying to the mail; in a case where a communication tool is a chat tool or a messenger, the correspondence frequency may be a time from a receipt of a mention to a replying to the mention. The content similarity can be calculated, for example, but not limited to, using a distance between the contents. The correspondence frequency may be based on calculating a historical performance mentioned below. The additional data may be, for example, but not limited to, information on employees which may be open to public in a company.

For keywords (425), the system extracts keywords from unstructured content as well as from structured metadata such as tags. For example, some keywords are used as a topic name.

An embodiment of analyzing the content will be explained below by referring to FIG. 4B.

Figure 4B:
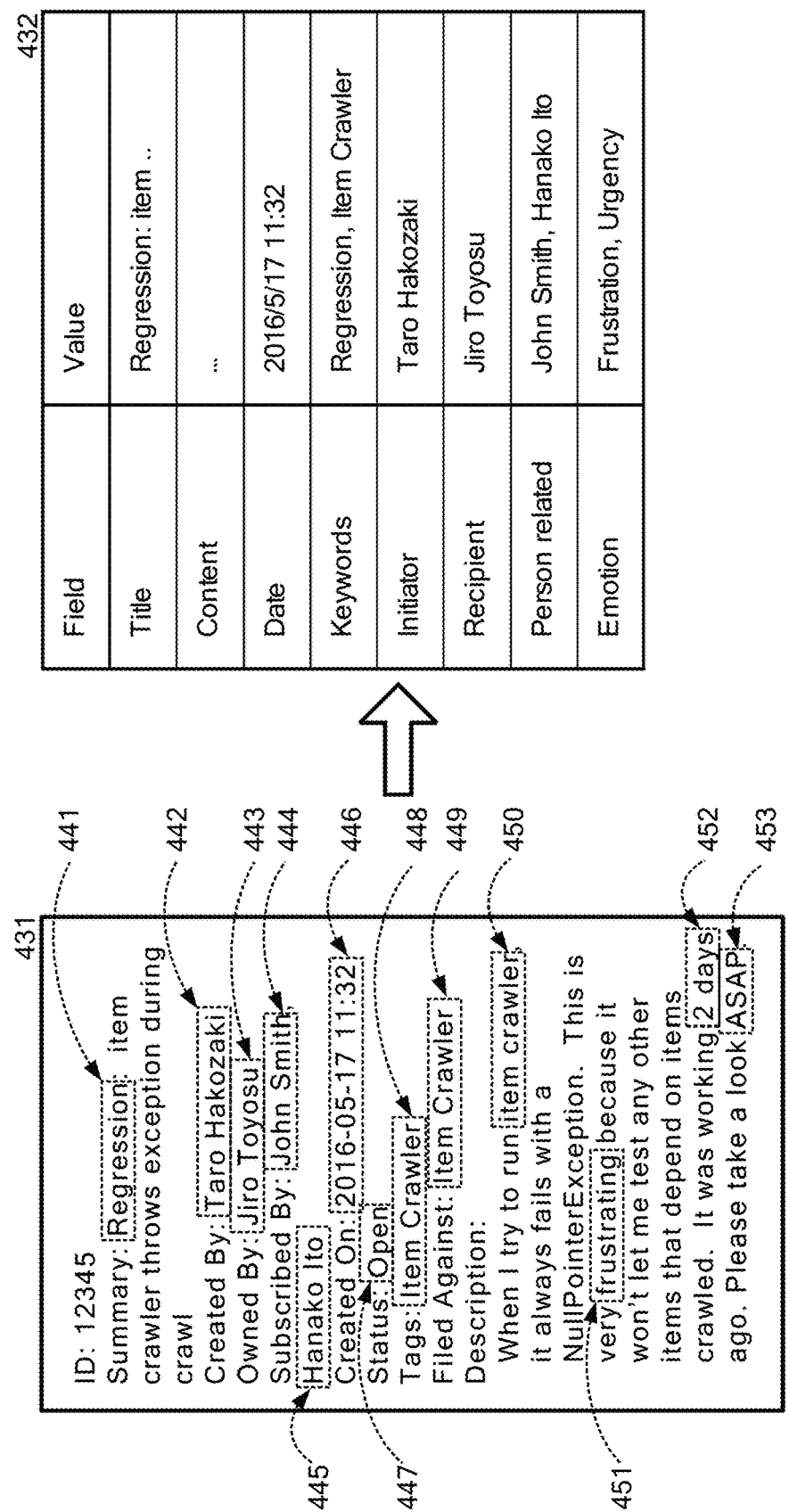
FIG. 4B illustrates an embodiment of an analysis result.

With reference now to FIG. 4B, FIG. 4B illustrates an embodiment of an analysis result.

The content (431) was obtained from RTC item. The content (431) relates to a problem report, for example, a bug fix report. The content (431) includes the following items: ID, Summary, Created By, Owned By, Subscribed By, Created On, Status, Tags, Filed Against, and Descriptions.

The system analyses the content (431) and obtain the following values: "Regression" (441), "Taro Hakozaki" (442), "Jiro Toyosu" (443), "John Smith" (444), "Hanako Ito" (445), "2016-05-17 11:32" (446), "Open" (447), "Item Crawler" (448), "Item Crawler" (449), "Item Crawler" (450), "frustrating" (451), "2 days" (452) and "ASAP" (453).

The values, "Taro Hakozaki" (442), "Jiro Toyosu" (443) and "John Smith" (444), "Hanako Ito" (445), may be extracted as the analysis results of personal detection and may be weighed more in terms of calculating the degree of involvement.

The values, "2016-05-17 11:32" (446) and "2 days" (452), may be extracted as the analysis results of the date and time-series.

The value, "Open" (447) in "Status", may be extracted as the analysis result of transition history. The value, "Open" (447), indicates that a change from fixed to open indicates the issue being not resolved.

The values, "Regression" (441), "Item Crawler" (448), "Item Crawler" (449) and "Item Crawler" (450), may be extracted as the analysis results of keywords.

The values, "frustrating" (451) and "ASAP" (453), may be extracted as the analysis results of emotion and express urgency and importance.

Table (432) shows the analysis results obtain in step 203 described in FIG. 2A. Table (432) has the items, Field and its Value. In Table (432), the value of the content is the same as that described in the content (431). Accordingly, the descriptions of this value are omitted in Table (432) and expressed only as " . . . ".

With reference now back to FIG. 2A, the system may store the analysis results in a storage (292) which can be accessible by the system. The analysis results comprise information on user groups, information on topics and degrees of involvement of users with the topic. The storage (292) may be, for example, but not limited to, an internal disk such as the b disk (108) described in FIG. 1, a NAS or a storage in a server.

In step 204, the system displays, for a designated period of time, a graph view which shows the amount of change in communication, using the analysis results. The designated period of time may be, for example but not limited to, an hour(s), a half day, a day(s), a week(s), a month(s) or a working time. The designated period of time may in advance determined by an operator or administrator of the system according to an embodiment of the present invention.

An embodiment of the graph view will be explained below by referring to FIG. 5A.

Figure 5A:
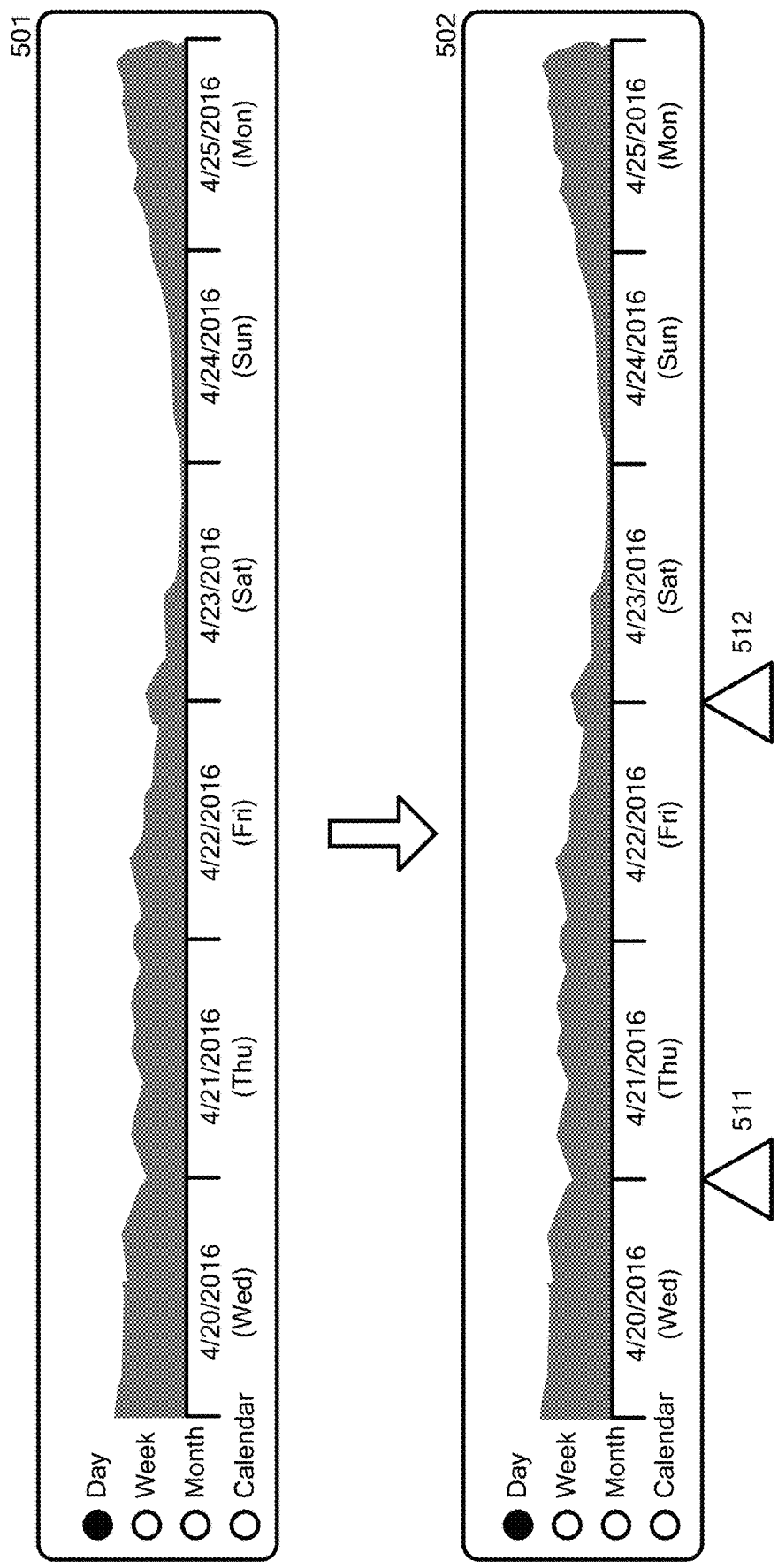
FIG. 5A illustrates an embodiment of a graph view which shows the amount of change in communication.

With reference now to FIG. 5A, FIG. 5A illustrates an embodiment of the graph view mentioned above.

The graph view (501) shows the amount of change in communication made from Apr. 20, 2016, to Apr. 25, 2016.

The graph view (501) shows the total amount of communication data on Y axis. The graph view (501) shows that the total amount of communication data decreases during weekend.

The operator may modify the scale of a time on X axis by selecting an icon of circle indicating a unit of a day(s), week(s) or month(s); inputting, touching, or selecting a period of time; or selecting a period of time, for example, using a calendar.

With reference now to FIG. 2B, in step 209, the system judges whether a period of time on the graph view is selected by an operator or not in order to decide a period of time for displaying a user-objects view. If the judgment is positive, the system proceeds to step 210. Meanwhile, if the judgment is negative, the system proceeds to step 211.

An embodiment of selecting a period of time on the graph view will be explained below by referring to FIG. 5A.

With reference now again to FIG. 5A, FIG. 5A illustrates an embodiment of selecting a period of time on the graph view.

The graph view (502) shows the amount of change in communication made from Apr. 20, 2016, to Apr. 25, 2016, which is the same as that described in the graph view (501). Further, the graph view (502) shows that the period of time from Apr. 21, 2016, to Apr. 22, 2016 is now selected by the operator. The selection may be done, for example, but not limited to, using icons (511 and 512), inputting, touching, or selecting a period of time; or selecting a period of time, for example, using a calendar.

With reference now back to FIG. 2B, in step 210, the system dynamically displays, for a selected period of time (or a designated period of time) and for each topic, user objects assigned according to a degree of involvement of a user with a topic in a user-object's window, using the analysis results.

The user objects may be displayed by, for example, but not limited to, an icon. Each of the user objects may be different, depending on the degree of involvement of a user with a topic and to the information on a user group. For example, a size, a shape, a color or a combination of these of user objects may be different, depending on the degree of involvement of a user with a topic and to the information on a user group.

In step 211, the system dynamically displays, for a predefined period of time (or a designated period of time) and for each topic, user objects assigned according to a degree of involvement of a user with a topic in a user-object's window, using the analysis results.

An embodiment of the user-object's window will be explained below by referring to FIG. 5B.

Figure 5B:
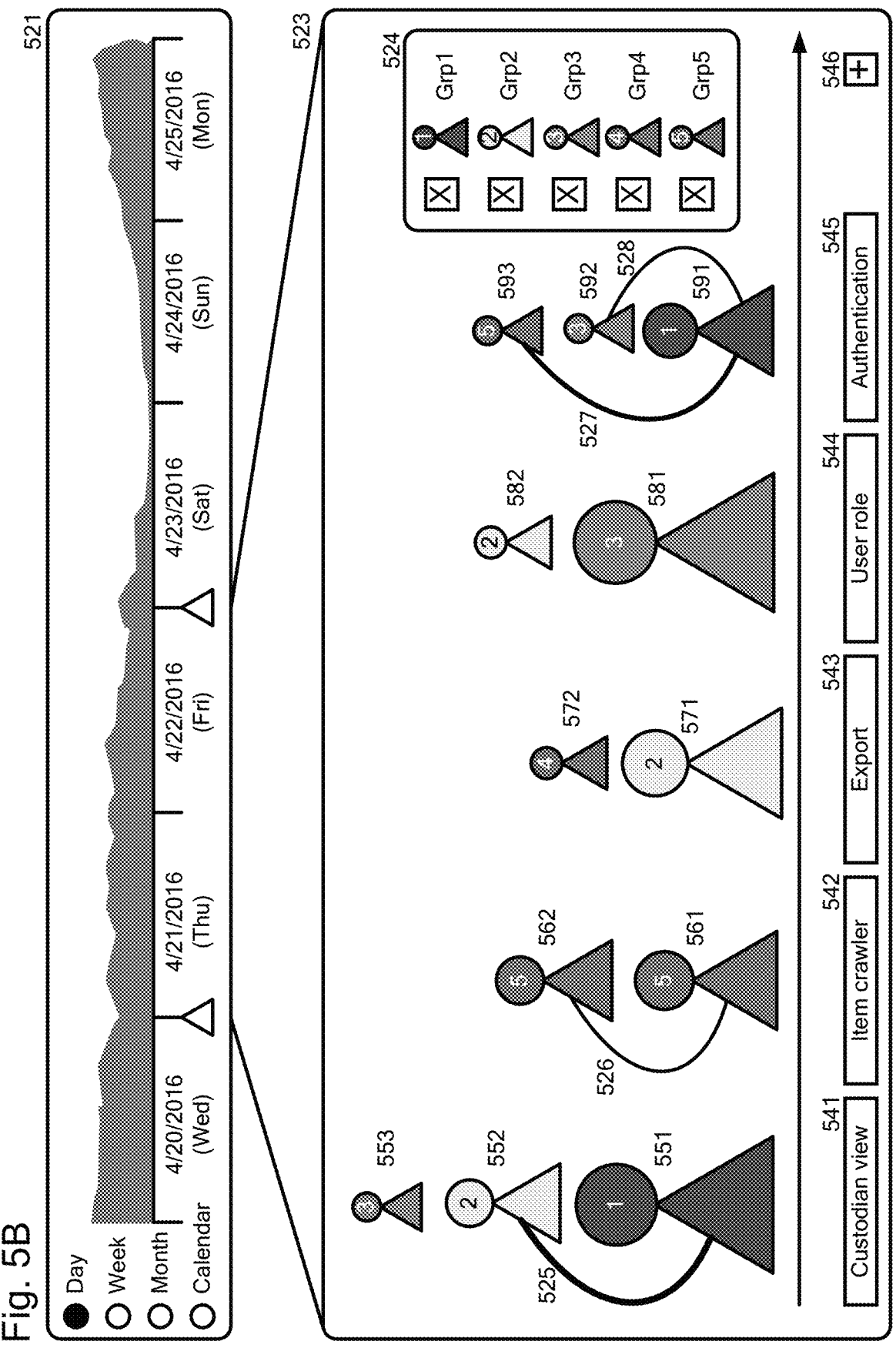
FIG. 5B illustrates an embodiment of a user-objects view and a communication volume object in the user-objects view together with the graph view.

With reference now to FIG. 5B, FIG. 5B illustrates an embodiment of a user-objects view together with the graph view.

The graph view (521) is the same as that described in the graph view (502) described in FIG. 5A.

The user-objects view (523) displays a plurality of user objects (551 to 553; 561 and 562; 571 and 572; 581 and 582; and 591 to 593) and a group filtering-selection view (524).

The plurality of user objects (551 to 553; 561 and 562; 571 and 572; 581 and 582; and 591 to 593) may be separately displayed in each of topic (541, 542, 543, 544 and 545). In detail, the user objects (551 to 553) may be displayed in association with the topic, "Custodian view", (541); the user objects (561 and 562) may be displayed in association with the topic, "Item crawler", (542); the user objects (571 and 572) may be displayed in association with the topic, "Export", (543); the user objects (581 and 582) may be displayed in association with the topic, "User role", (544); and the user objects (591 to 593) may be displayed in association with the topic, "Authentication", (545).

In a case where the operator wants to show another or other topics in the user-objects view (523), the operator may click, hover or touch a "+" icon (546) on the user-objects view (523).

For example, a size, a shape, a color or a combination of these of user objects may be different, depending on the degree of involvement of a user with a topic and to the information on a user group. That is, the displaying of each of the user objects is modified according to the degree of involvement and the information on a user group.

In the topic, "Custodian view", the size of the user object (551) is larger than that of the user object (552). Accordingly, the degree of involvement of the user associated with the user object (551) with the topic, "Custodian view" is larger than that of the user associated with the user object (552) with the topic, "Custodian view".

The group filtering-selection view (524) shows icons for groups associated with the user objects (551 to 553; 561 and 562; 571 and 572; 581 and 582; and 591 to 593). The group filtering-selection view (524) shows five icons for the following five groups: "Grp1", "Grp2", "Grp3", "Grp4", and "Grp5".

The group filtering-selection view (524) further shows a filtering-selection icon for each of the icons for the five groups. Each of the filtering-selection icons may be displayed with, for example, but not limited to, a checkbox. In a case where a mark is made in the checkbox, a group associated with this checkbox is valid for displaying user-objects icon(s) associated with the group. Meanwhile, in a case where no mark is made in the checkbox, a group(s) associated with this checkbox is invalid for displaying user-objects icon(s) associated with the group.

With reference now back to FIG. 2B, in step 212, the system displays, between user objects associated with the users, a communication volume object which represents a communication volume between users on a topic.

An embodiment of the communication volume object will be explained below by referring to FIG. 5B.

With reference now again to FIG. 5B, FIG. 5B illustrates an embodiment of a communication volume object in the user-objects view.

The following three communication objects are displayed in the user-objects view (523): the communication object (525) between the user object (551) and the user object (552); the communication object (526) between the user object (561) and the user object (562); the communication object (527) between the user object (591) and the user object (593); and the communication object (528) between the user object (591) and the user object (592).

The communication volume objects may be displayed by, for example, but not limited to, an icon. Each of the communication volume objects may be different, depending on the communication volume between or among the users. For example, a size, a shape, a color or a combination of these of the communication volume objects may be different, depending on the communication volume between or among the users.

The width of the communication object (525) is wider than that of the communication object (527). Accordingly, the communication volume for the communication object (525) is larger than that for the communication object (527).

In a case where the size of each of the communication volume objects is different with each other, depending on the communication volume between or among the users and the communication volume is larger, the size of the communication volume object corresponding to this communication volume may be displayed, for example, but not limited to, by broader lines.

With reference now to FIG. 2C, in step 213, the system judges whether a filtering selection of a user group from the user-objects view is done or not. The filtering selection may be done by, for example, but not limited to, unchecking a mark in a checkbox associated with a user group. If the judgment is positive, the system proceeds to step 214. Meanwhile, if the judgment is negative, the system proceeds to step 215.

In step 214, the system undisplays one or more user objects associated with one or more users belonging to the user group on which the filtering selection for the user group was made.

An embodiment of the filtering selection of a user group from the user-objects view and the undisplaying of one or more user objects associated with a user belonging to the user group on which a filtering selection of the user group was made will be explained below by referring to FIGS. 5B and 5C.

With reference now again to FIG. 5B, the group filtering-selection view (524) displays five icons for the following five groups, "Grp1", "Grp2", "Grp3", "Grp4" and "Grp5", and filtering-selection icon for each of the icons for the five groups.

In a case where an operator wants to undisplay a user object(s) associated with the group, "Grp3", the operator unchecks a mark in a checkbox associated with the group, "Grp3". The result of the uncheck will be explained by referring to FIG. 5C.

With reference now again to FIG. 5C, the group filtering-selection view (534) displays that the filtering-selection icon for the group, "Grp3", in the group filtering-selection view (534) is unchecked. In response to the uncheck, the user object (see 572 in FIG. 5B) which is associated with a user belonging to the group, "Grp3", is undisplayed from the user-objects view (533). In a case where a communication object is displayed for a user group icon associated with a user belonging to an unchecked group, the communication object is also undisplayed.

With reference now back to FIG. 2C, in step 215, the system judges whether a click, hover or touch on the user object, information on a user associated with the user object is done or not. If the judgment is positive, the system proceeds to step 216. Meanwhile, if the judgment is negative, the system proceeds to step 217.

In step 216, the system displays information on a user associated with the user object, one or more communication tools for communicating the user, a communication history of the user, a communication history between the user and the operator or among the user, the operator and another or other users, or a combination of these.

The information may be, for example, but not limited to, a name or nickname of the user associated with the user object; a telephone or facsimile number of the user; a name of an affiliation to which the user belongs; one or more contact addresses for a communication tool of the user; or a combination of these. The one or more communication tools may be those defined above. The communication history may be texts of communication between or among each of, a part of or all of the users and may include content summary, recent activities or a combination of these.

In a case where one or more communication tools are displayed, the communication tools may be prioritized to display. The prioritization may be made based on, for example, but not limited to, a current user status. The current user status may be, for example, but not limited to, the followings: an availability of the communication tool by the user; a historical performance of using the communication tool by the user; one or more properties associated with the user; or a degree of secrecy, urgency degree, seriousness or importance degree, priority associated with the topic or the number of users who should be included.

The availability may include which communication tool the user can now use. The availability may be calculated, for example, using online for now or recent activities of the user.

The historical performance may include, for example, but not limited to, a historical performance of a communication tool used by the user itself or used by the user(s) and the operator. The historical performance may be calculated, for example, using the total amount of the user activities on a communication tool or responsiveness of the user activities on a communication tool.

The property may include, for example, but not limited to, a job position of a user, a role of a user in a group, a group or organization to which a user belongs. The property may be calculated, for example, using a list for scoring the job position, the role, or a combination of these.

The degree of secrecy, urgency degree, seriousness or importance degree, priority associated with the topic may relate to a topic. Each of the degree may be calculated, for example, using a list for scoring the secrecy, the urgency, the seriousness, the importance, or the priority.

The number of users who should be included may be users having the same amount of activities as the user. In other words, the number of users who should be included may be the number of users who should be contacted simultaneously. The number of users who should be included can be calculated based on the degree of involvement.

The number of users who should be included may be calculated, for example, using a weight value defined as the following equation: N>5/5>=N>2/2>=N, where N denotes the number of users who should be included.

The number of N may be, for example, defined as the following three patterns: N>5, 5>=N>2, and 2>=N.

In a case where the number of users who should be included is many, the pattern, "N>5", can be used. In a case where the number of users who should be included is not so many, the pattern"5>=N>2", can be used. In a case where the number of users who should be included is few, the pattern"2>=N", can be used. Accordingly, a different the pattern can be used, depending on the number of users who should be included.

In a case where the pattern, "N>5", is used, the number of users who should be included is many. Accordingly, for example, the following value may be used. For a mail software, such as "Verse®" and "Notes Client®", the value is set to, for example, "1". Similarly, for a chat tool, such as "Slack®" which is used for a group chatting and used as an instant communication tool, the value is set to, for example, "1". For a SCM, such as "RTC" which is used for a person-to-person chatting, the value is set to, for example, "0.6", considering a weaker instantaneous compared to that of the mail software and chat tool. For a chat tool, such as "Sametime®" which is basically used for a person-to-person chatting, the value is set to, for example, "0.2". The values mentioned above may be in advance determined by an operator or administrator of the system according to an embodiment of the present invention.

In a case where the pattern, "2>=N", is used, the number of users who should be included is one or two. Accordingly, for example, the following value may be used. For a chat tool, such as "Slack®" which is used for a group chatting and used as an instant communication tool, the value is set to, for example, "1". Similarly, for a chat tool, such as "Sametime®" which is basically used for a person-to-person chatting and used as an instant communication tool, the value is set to, for example, "1". For a SCM, such as "RTC" which is used for a person-to-person chatting, the value is set to, for example, "0.6", considering a weaker instantaneous compared to that of the mail software and chat tool. For a mail software, such as "Verse®" and "Notes Client®", the value is set to, for example, "0.2". The values mentioned above may be in advance determined by an operator or administrator of the system according to an embodiment of the present invention.

In a case where a communication tool has a higher priority, the communication tool may be displayed with a higher rank in a list of the communication tools. Meanwhile, in a case where a communication tool has a lower priority, the communication tool may be displayed with a lower rank in the list.

An embodiment of displaying information on the user associated with the user object, one or more communication tools for communicating the user, a communication history of the user, a communication history between the user and another user or among the user and other users, or a combination of these will be explained below by referring to FIG. 5C and FIGS. 7A and 7B.

With reference now again to FIG. 5C, FIG. 5C illustrates a selection of a user object in a user-objects view.

Let us suppose that the operator wants to select a user object (562) in the user-objects view (533). The selection may be done by a click, hover or touch (598) on the user object (562). In response to the click, hover or touch on the user object (562), the system may display information on a user associated with the user object (562).

Figure 7A:
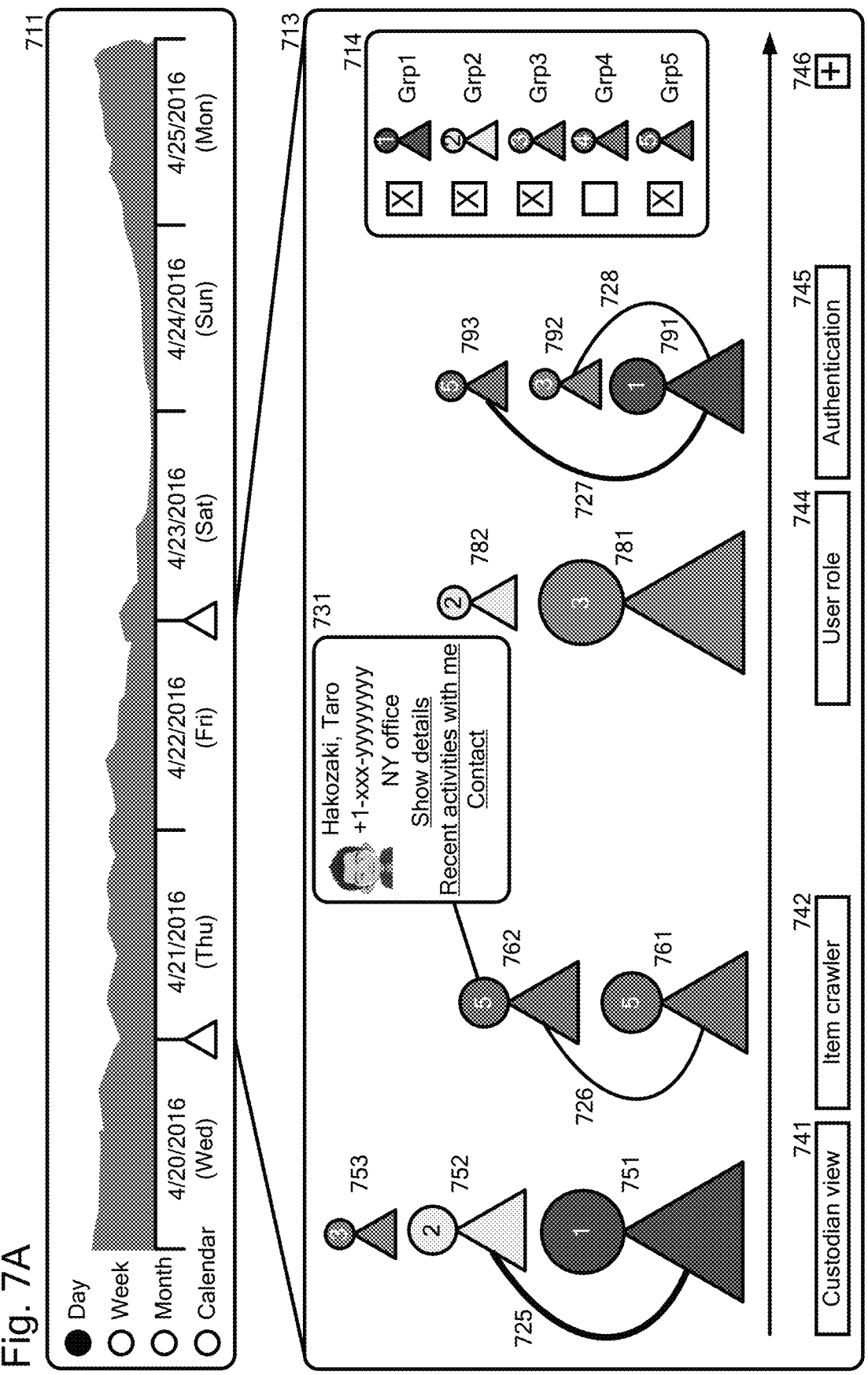
FIG. 7A illustrates an embodiment of information on a user associated with the user object which may be shown in or on the user-objects view.

With reference now to FIG. 7A, FIG. 7A illustrates an embodiment of information on the user associated with the user object which may be shown in or on the user-objects view.

Figure 5C:
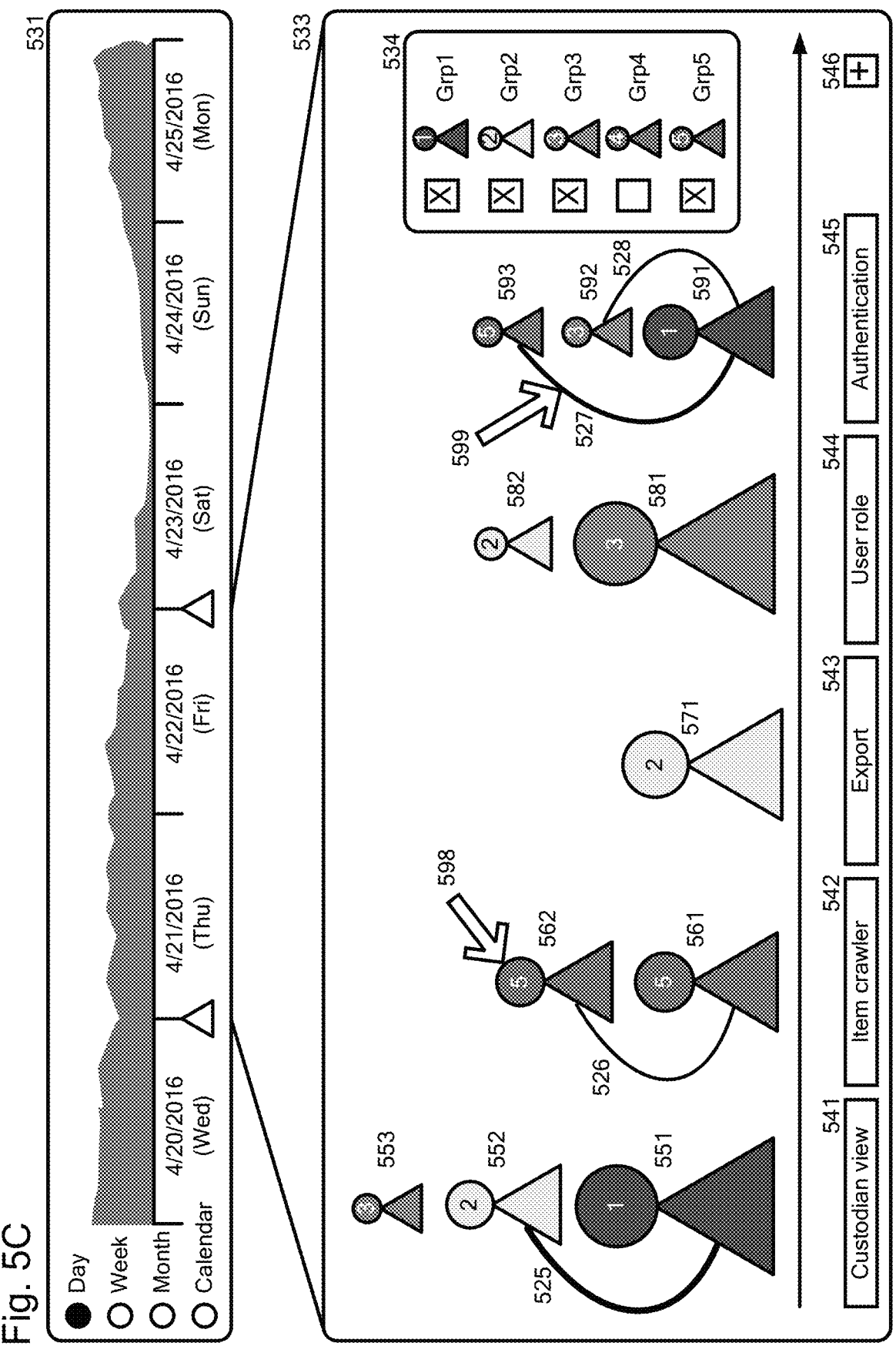
FIG. 5C illustrates an embodiment of a filtering selection of a user group from the user-objects view.

The user-objects view (713) shows information (731) on the user associated with the user object (762) (the user object (762) corresponding to the user object (562) in FIG. 5C). The information may be, for example, but not limited to, a person card.

The information (731) on the user, "Hakozaki, Taro", includes the name of the user associated with the user object (762), the telephone number of the user, the affiliation name of the user, and the following three link texts for further displaying information on the user: "Show details"; "Recent activities with me"; and "Contact".

Figure 7B:
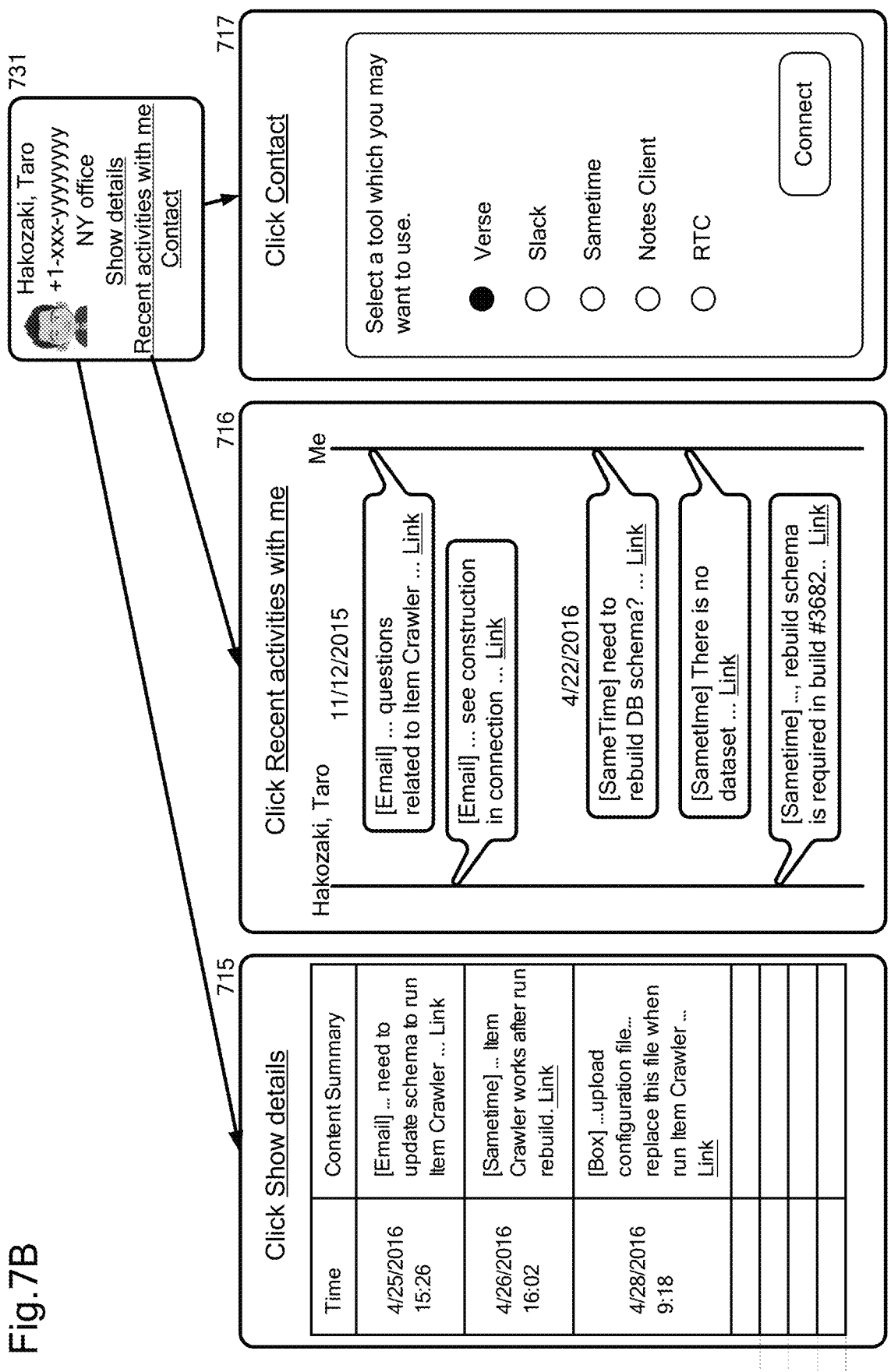
FIG. 7B illustrates an embodiment of one or more communication tools for communicating with the user and a communication history between the user and another user.

With reference now to FIG. 7B, FIG. 7B illustrates an embodiment of a communication history of the user, a communication history between the user whose user object was selected and "Me", or an operator, who clicked, hovered or touched the link text, and one or more communication tools for communicating with the user.

In a case where the operator clicks, hovers or touches the link text, "Show details", the system may display the details (715). The details may include each of content summaries in the latest communication order together with time (715) on which the communication was made. The content summaries include summary of the involvement history with a topic and the link character "Link" in order to see the content before summarization or extraction.

In a case where the operator clicks, hovers or touches the link text, "Recent activities with me", the system may display the recent activities (716). The recent activities (716) may include communications (716) made between the user, "Hakozaki, Taro", whose user object was selected and the user, "Me" or the operator, who clicked, hovered or touched the link text. The whole content between the user and the operator can be seen by clicking, hovering or touching the link character "Link".

In a case where the operator clicks, hovers or touches the link text, "Contact", the system may display a plurality of communication tools (717), for example, in a prioritized order in order to communicate with the user. The operator can select a communication tool that the operator wants to use for communicating with the user. In a case where the operator communicates with the user, the operator may click, hover or touch the button, "Connect".

In FIG. 7B, the plurality of communication tools (717) are listed in the following prioritized order: "Verse", "Slack", "Sametime", "Notes Client" and "RTC".

An example of calculating prioritized order of the plurality of communication tools will be explained below by referring to FIG. 10.

With reference now to FIG. 10, FIG. 10 illustrates an embodiment of calculating prioritized order of the plurality of communication tools.

Table (1001) shows the scores for each of the following communication tools, "Verse®", "Notes Client®", "Sametime®", "Slack®", and "RTC".

For each of the communication tools, the following current user status are calculated: an availability of the communication tool by the user ("Availability"), a historical performance of using the communication tool by the user ("Historical performance"), an urgency degree ("Urgent degree=High"), and the number of users who should be included ("Number>5").

The value of "Availability" in each of the communication tools may be, for example, but not limited to, 0 or 1 in a case where the sum of each value in a line mentioned below is only calculated. Alternatively, the value of "Availability" in each of the communication tools may be, for example, but not limited to, 0 or 0.1 in a case where the product of each value in a line mentioned below is only calculated or both of the sum and the product are calculated.

The value of "Historical performance" in each of the communication tools may be set, for example, so that a total value of each of the communication tools is one.

The values of "Urgent degree" in each of the communication tools may vary depending on a value associated with the urgent degree. In Table (1001), a set of values is determined, depending on a communication tool, as similarly described for the number of users who should be included. For example, in a case where the "Urgent degree" is set to high, the values of "Urgent degree" for an instant communication tool, such as "Slack®" "Sometime®, may be set to higher, for example, "1", while the values of "Urgent degree" for an instant communication tool, such as "Verse®", "Notes Client®" and "RTC" may be set to lower, for example, "0.2". Meanwhile, in a case where the "Urgent degree" is set to low, the values of "Urgent degree" for an instant communication tool, such as "Slack®" "Sametime®, may be set to lower, for example, "0.6", while the values of "Urgent degree" for an instant communication tool, such as "Verse®", "Notes Client®" and "RTC" may be set to, for example, "0.4" which is lower than that of "Slack®". In the latter case, a difference between the values may be set to be smaller. This is because an instantaneous is not required for users to communicate between or among users.

The value of "Number>5" denotes "N>5" mentioned above. As stated above, for "Verse®" and "Notes Client®" which are used as a mail software, the value is set to, for example, "1". Similarly, "Slack®" which is used for a group chatting, the value is set to, for example, "1". For "RTC" which is used for a SCM, the value is set to, for example, "0.6". For "Sametime®" which is a chat tool and basically used for a person-to-person chatting, the value is set to, for example, "0.2".

denotes that, in a case where the number of users who should be included is more or equal to 5, a set of weight value which is in advance determined is set to, for example, the following: Verse="1", Notes Client="1", Sametime="0.2", Slack="1" and RTC="0.6".

The result of the sum or product for each of the communication tools are shown in Table (1001). In Table (1001), "Sum" in "Sum(/Product)" denotes a sum of each value in a line. In Table (1001), "Product" in "Sum(/Product)" denotes a value of multiplying each value in a line.

The system gives a priority order to the communication tools as follows: "Verse" (2.6), "Slack" (2.3), "Sametime" (1.5), "Notes Client" (1.4), and "RTC" (1.0), based on the sum. Accordingly, the system may display the communication tools, according to the priority order, as seen in FIG. 7B (see the plurality of communication tools (717)).

The system may use either of "Sum" or "Product" in Table (1001) for calculating a priority.

With reference now back to FIG. 2C, in step 217, the system judges whether a click, hover or touch on a communication volume object is done or not. If the judgment is positive, the system proceeds to step 218. Meanwhile, if the judgment is negative, the system proceeds to step 221.

In step 218, the system displays information on each of the users associated with the communication volume object, one or more communication tools for communicating with each of, a part of or all of the users, a communication history of the user, a communication history between or among the users, or a combination of these.

The information may be, for example, but not limited to, a name or nickname of each of the users associated with the communication volume object; a telephone or facsimile number of each of the users; a name of an affiliation to which each of the users belongs; one or more contact addresses for a communication tool of each of the users; or a combination of these. The one or more communication tools may be those defined above. The communication history may be texts of communication between or among each of, a part of or all of the users and may include content summary, recent activities or a combination of these.

In a case where one or more communication tools are displayed, the communication tools may be prioritized to display. The prioritization may be made based on, for example, but not limited to, a current user status. The current user status may be, for example, but not limited to, the followings: an availability of the communication tool by each of the users; a historical performance of using the communication tool by each of the users; one or more properties associated with each of the users; or a degree of secrecy, urgency degree, seriousness or importance degree, priority associated with the topic or the number of users who should be included.

The availability, the historical performance, the degree of secrecy, urgency degree, seriousness or importance degree, priority associated with the topic, and the number of users who should be included may be calculated as stated above.

In a case where a communication tool has a higher priority, the communication tool may be displayed with a higher rank in a list of the communication tools. Meanwhile, in a case where a communication tool has a lower priority, the communication tool may be displayed with a lower rank in the list.

An embodiment of displaying information on each of the users associated with the communication volume object, one or more communication tools for communicating with each of, a part of or all of the users, a communication history of the user, a communication history between or among the users, or a combination of these will be explained below by referring to FIG. 5C and FIGS. 8A and 8B.

With reference now again to FIG. 5C, FIG. 5C illustrates a selection of a communication volume object in a user-objects view.

Let us suppose that the operator wants to select a communication volume object (527) in the user-objects view (533). The selection may be done by a click, hover or touch (599) on the communication volume object (527). In response to the click, hover or touch on the communication volume object (527), the system may display information on each of the users associated with the communication volume object (527).

Figure 8A:
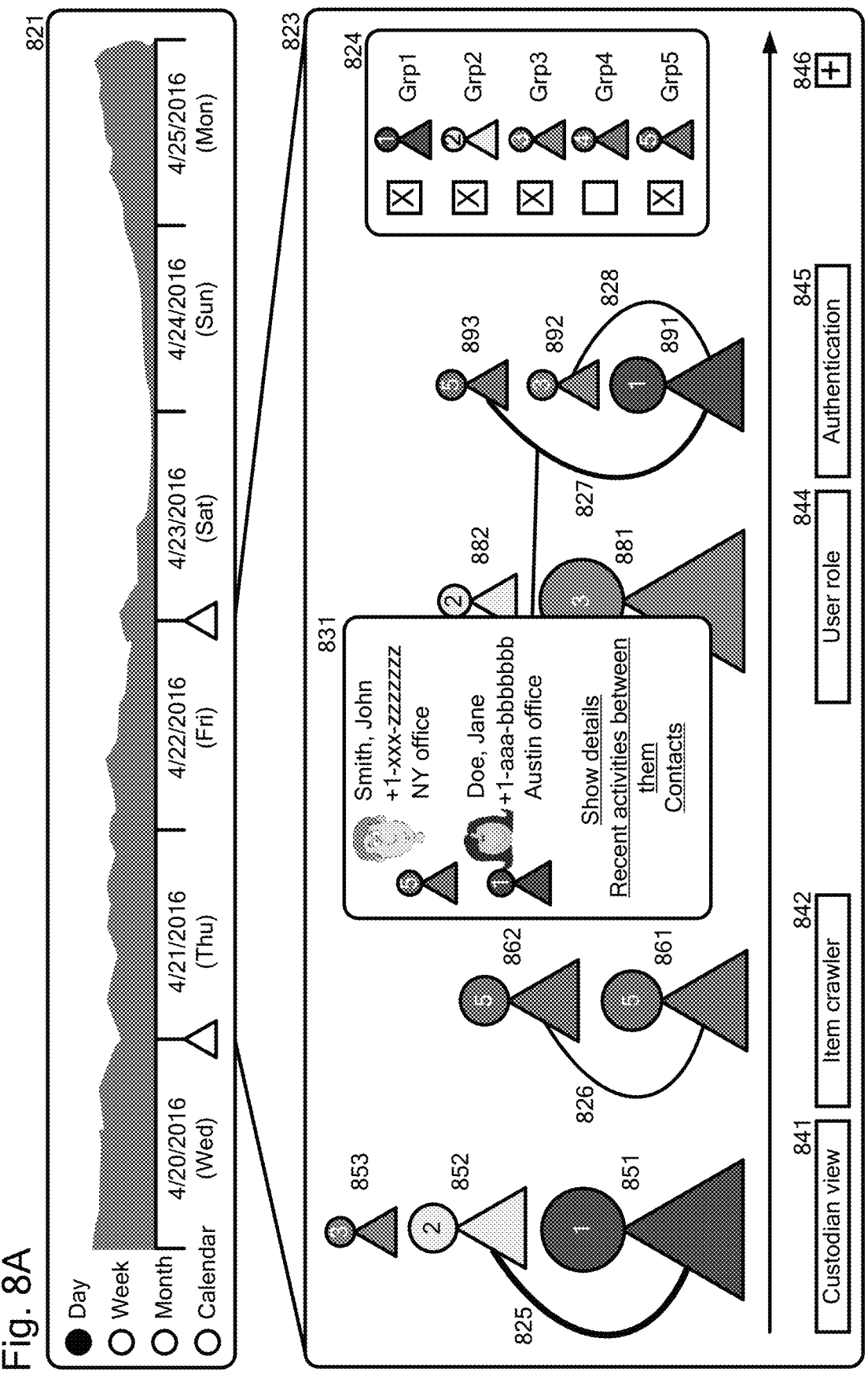
FIG. 8A illustrates an embodiment of information on each of users associated with the communication volume object which may be shown in or on the user-objects view.

With reference now to FIG. 8A, FIG. 8A illustrates an embodiment of information on each of the users associated with the communication volume object which may be shown in or on the user-objects view.

The user-objects view (823) shows information (831) on each of the users associated with the communication volume object (827) (the communication volume object (827) corresponding to the communication volume object (527) in FIG. 5C).

The information (831) on each of the users, "Smith, John" and "Doe, Jane", includes the name of each of the users associated with the communication volume object (827), the telephone number of each of the users, the affiliation name of each of the users, and the following three link texts for further displaying information on each of the users: "Show details"; "Recent activities between them"; and "Contacts".

Figure 8B:
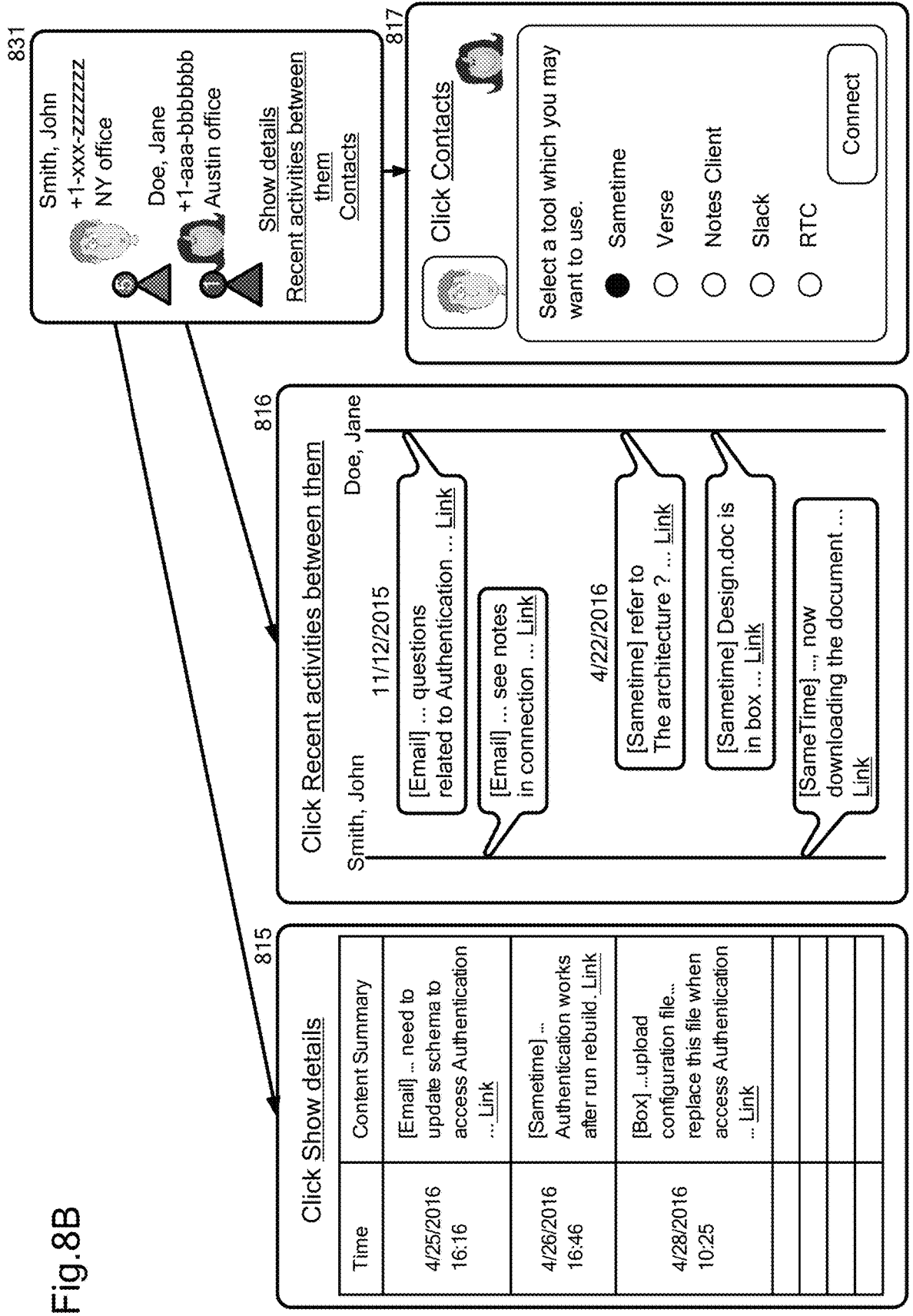
FIG. 8B illustrates an embodiment of one or more communication tools for communicating with each of the users and a communication history of the users, a communication history between or among the users.

With reference now to FIG. 8B, FIG. 8B illustrates an embodiment of one or more communication tools for communicating with each of the users and a communication history between them.

In a case where the operator clicks, hovers or touches the link text, "Show details", the system may display content summary (815) of made by each of the users or by one of the users. The content summary includes summaries of various kinds of the communication tools in the latest communication order.

In a case where the operator clicks, hovers or touches the link text, "Recent activities between them", the system may display communications (816) made between the user, "Hakozaki, Taro", whose user object is connected to the user object associated with the user, "Doe, Jane", via the communication volume object (827) and the user, "Doe, Jane", whose user object is connected to the user object associated with the user, "Hakozaki, Taro", via the communication volume object (827).

In a case where the operator clicks, hovers or touches the link text, "Contacts", the system may display a plurality of communication tools (817) in a prioritized order for each of the users or one of the users. The operator can select the user with which the operator wants to communicate by selecting either of the user icons corresponding to the users. Further, the operator can select a communication tool that the operator wants to use for communicating with one of the users or all of the users.

The system gives a priority order to the communication tools as follows: "Sametime" (2.7), "Verse" (2.4), "Notes Client" (1.9), "Slack" (1.6), and "RTC" (1.0). The system may display the communication tools, according to the priority order, as seen in FIG. 7B (see the plurality of communication tools (717)). Accordingly, the system may display the communication tools, according to the priority order, as seen in FIG. 8B (see the plurality of communication tools (817)).

Figure 2D:
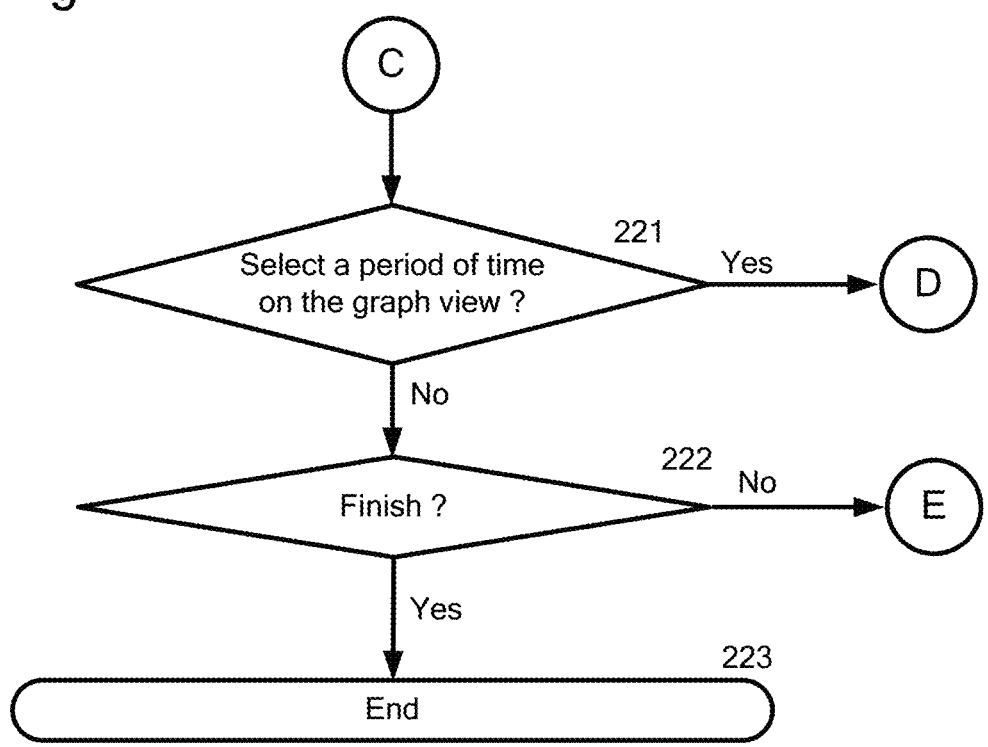

With reference now to FIG. 2D, in step 221, the system judges whether a period of time on the graph view is selected by the operator or not in order to decide a period of time for displaying a user-objects view. If the judgment is positive, the system proceeds back to step 210. Meanwhile, if the judgment is negative, the system proceeds to step 222.

In step 222, the system judges whether the process is terminated or not. If the judgment is positive, the system proceeds to a final step 223. Meanwhile, if the judgment is negative, the system proceeds back to step 213.

In step 223, the system terminates the process mentioned above.

With reference now to FIGS. 3A to 3D, FIGS. 3A to 3D illustrate another embodiment of the flowchart of the process for visualizing analysis results of contents, using a topic view mentioned below.

A system such as the computer (101) performs each of the steps described in each of FIGS. 3A to 3D. The computer may be implemented as a single computer or a plurality of computers.

With reference now to FIG. 3A, in step 301, the system starts the process for summarizing a plurality of texts.

Each of steps 302 and 303 correspond to each of steps 202 and 203 described in FIG. 2A, respectively. Accordingly, the overlapping explanations of steps 302 and 303 will be omitted here.

In step 304, the system displays, for a designated period of time and for each user group, a topic view which shows a topic object indicating on which topic the communication was made. The designated period of time may be, for example but not limited to, an hour(s), a half day, a day(s), a week(s), a month(s) or a working time. The designated period of time may in advance determined by an operator or administrator of the system according to an embodiment of the present invention.

An embodiment of the topic view will be explained below by referring to FIG. 6A.

Figure 6A:
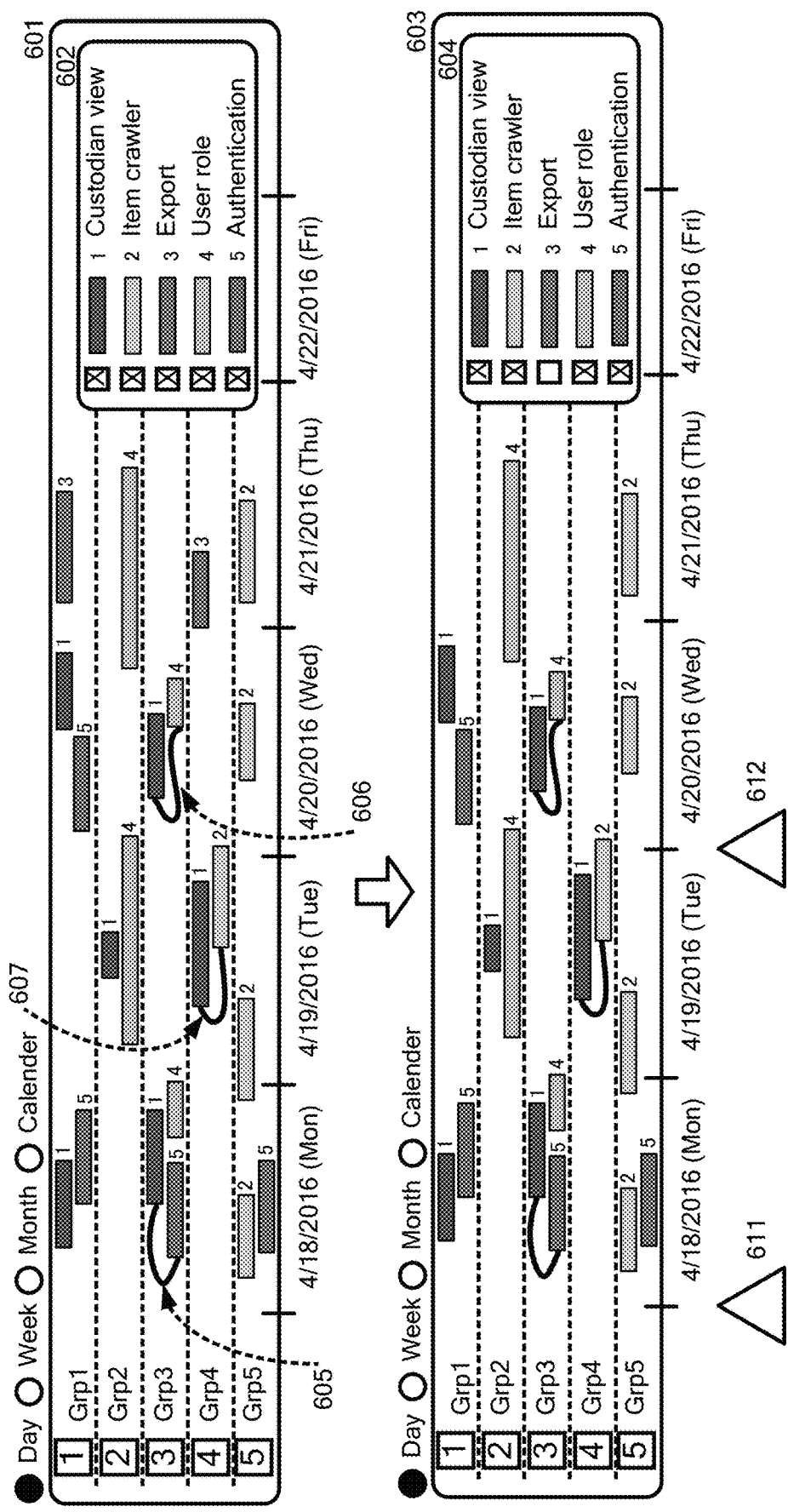
FIG. 6A illustrates an embodiment of a topic view which shows a topic object indicating on which topic the communication was made.

With reference now to FIG. 6A, FIG. 6A illustrates an embodiment of the topic view mentioned above.

The topic view (601) shows topic objects indicating on which topic the communication was made from Apr. 18, 2016, to Apr. 22, 2016.

The topic can be automatically generated using the analysis results and optionally manually augmented. For example, the system extracts keywords from the contents collected in a predefined time, for example, a day. After then, the system obtains one-hour data for each group, calculates the keyword appearance and then filters the keyword appearance, using the predefined threshold. Finally, the system repeats the calculation and the filtration for the remained hour-data.

The groups can be automatically generated using the analysis results and optionally manually augmented.

One or more topic objects in each of the topics are separately displayed in each of the following groups: "Grp1", "Grp2", "Grp3", "Grp4" and "Grp5". The number of group may be decided in advance, for example, the top five or ten and be configurable by an operator or administrator of the system according to an embodiment of the present invention.

The topic view (601) further shows a topic filtering-selection view (602). The topic filtering-selection view (602) shows icons for groups associated with topics. The topic filtering-selection view (602) shows five icons for the following five topics: "Custodian view", "Item crawler", "Export", "User role" and "Authentication".

The topic filtering-selection view (602) further shows a filtering-selection icon for each of the topics. Each of the filtering-selection icons may be displayed with, for example, but not limited to, a checkbox. In a case where a mark is made in the checkbox, a topic associated with this checkbox is valid for displaying topic(s) associated with the topic in the topic view (601). Meanwhile, in a case where no mark is made in the checkbox, a topic(s) associated with this checkbox is invalid for displaying a topic icon(s) associated with the topic.

The numerals 1 to 5 described in the topic view (601) and in the topic filtering-selection view (602) are added only for ease of specifying the topics on the topic view and the topic filtering-selection view.

The operator may modify the scale of a time on X axis by selecting an icon of circle indicating a unit of a day(s), week(s) or month(s); inputting, touching, or selecting a period of time; or selecting a period of time, for example, using a calendar.

With reference now back to FIG. 3A, in step 305, the system judges whether there is a co-occurrence relation between topics in one user group or not. The judgment may be made topics within a communication session.

The known art for extracting a representation of a co-occurrence relation between topics can be used.

In general, at the time when contents are indexed, in a case where there are a set of contents in which a certain keyword appears and a set of other contents and, further, another keyword appearance for the set of contents is higher than that for the set of other contents, it is judged that there is a co-occurrence relation between keywords.

In detailed examples, it is judged that there is a co-occurrence relation between topics, as seen in the following cases:

in a case where a content is obtained from a mail, a keyword A in a topic and a keyword B in another topic appear on one mail;

in a case where a content is a speech data obtained from, for example, a microphone or telephone, a keyword A in a topic and a keyword B in another topic appear on a closet time zone; and in a case where a content is a speech data obtained from, for example, a microphone or telephone, a keyword A in a topic and a keyword B in another topic appear on a same content, for example, one utterance of a user.

If the judgment is positive, the system proceeds to step 306. Meanwhile, if the judgment is negative, the system proceeds to step 307 described in FIG. 3B.

In step 306, the system further displays a co-occurrence object which shows the co-occurrence relation.

An embodiment of the co-occurrence object will be explained below by referring to FIG. 5A With reference now again to FIG. 6A, FIG. 6A illustrates an embodiment of the co-occurrence object mentioned above.

The occurrence object may be displayed by, for example, but not limited to, an icon. The occurrence object may be displayed so as to connect two or more different topic objects. Each of the occurrence objects may be different, depending on the degree of the occurrence. For example, a size, a shape, a color or a combination of these of the communication volume objects may be different, depending on the degree of the occurrence.

In a case where the size of each of the occurrence objects is different with each other, depending on the degree of the occurrence and the degree of the occurrence is larger, the size of the occurrence object corresponding to this degree of the occurrence may be displayed, for example, but not limited to, by broader lines.

The topic view (601) displays the three occurrence objects (605, 606 and 607). The occurrence object (605) is displayed, in the group, "Grp3", between the topic, "Custodian view", and the topic, "Authentication". The occurrence object (606) is displayed, the group, "Grp3", between the topic, "Custodian view", and the topic, "User role". The occurrence object (607) is displayed, the group, "Grp4", between the topic, "Custodian view", and the topic, "Item crawler".

Figure 3B:
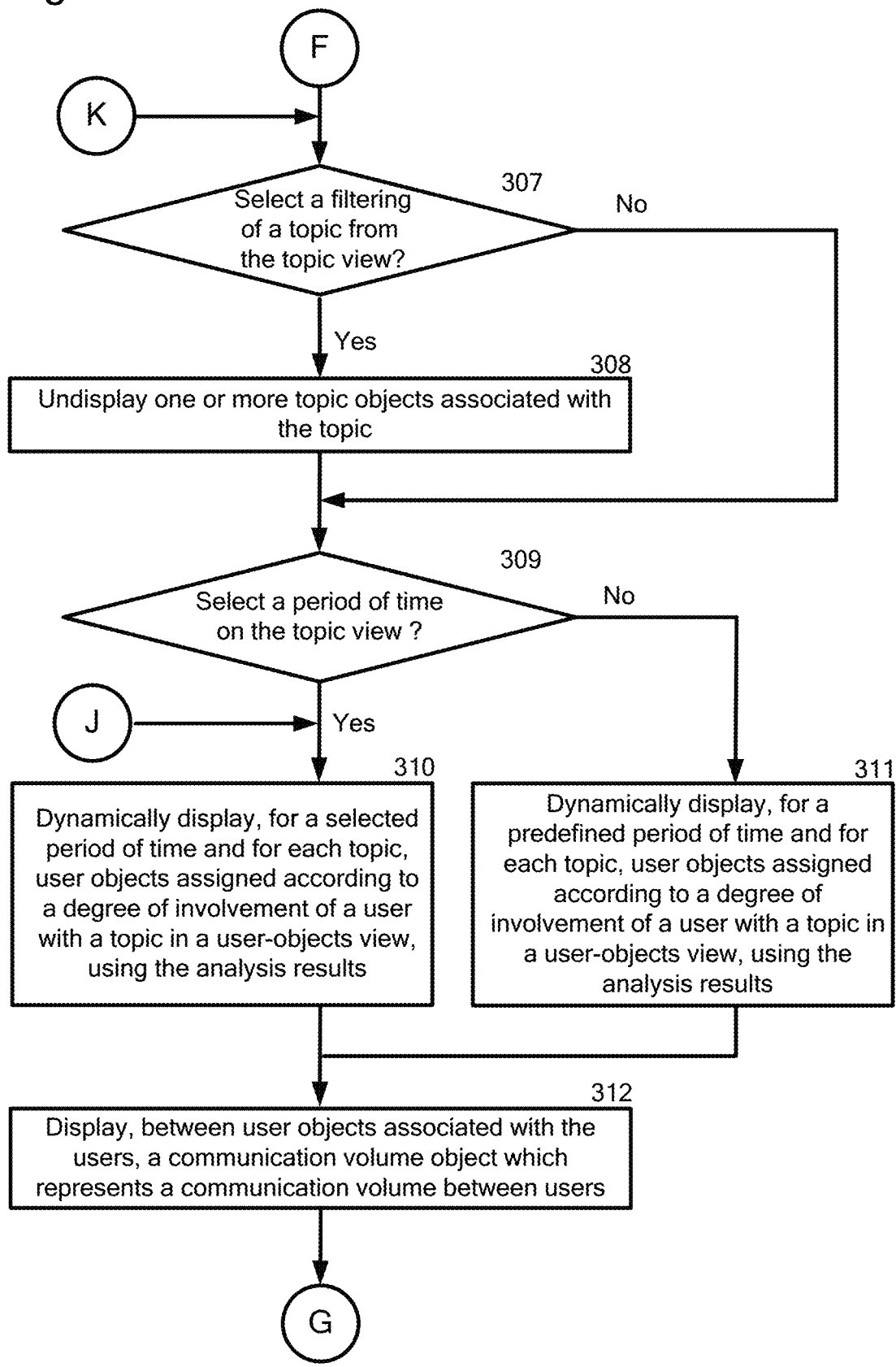

With reference now to FIG. 3B, in step 307, the system judges whether a filtering selection of a topic from the topic filtering-selection view is done or not. The filtering selection may be done by, for example, but not limited to, unchecking a mark in a checkbox associated with a user group. If the judgment is positive, the system proceeds to step 308. Meanwhile, if the judgment is negative, the system proceeds to step 309.

In step 308, the system undisplays one or more topic objects associated with the topic on which the filtering selection for the topic was made.

An embodiment of the filtering selection of a topic from the topic filtering-selection view and the undisplaying of one or more topic objects associated with the topic on which a filtering selection for the topic was made will be explained below by referring to FIG. 6A.

With reference now again to FIG. 6A, the topic filtering-selection view (602) in the topic view (601) displays five icons for the five topics mentioned above.

In a case where an operator wants to undisplay a topic object(s) associated with the topic, "Export", the operator unchecks a mark in a checkbox associated with the topic, "Export". In response to the uncheck, the topic objects which are marked with the numeral "3" in the topic view (601) and associated with the topic, "Export", are undisplayed from the topic view (601). The result of the uncheck will be shown in the topic view (603).

The topic filtering-selection view (604) on the topic view (603) displays that the filtering-selection icon for the topic, "Export", in the group filtering-selection view (604) is unchecked and the topic objects which are marked with the numeral "3" are undisplayed. In a case where an occurrence object is displayed for a topic object associated with an unchecked topic, the occurrence object is also undisplayed.

With reference now to FIG. 3B, in step 309, the system judges whether a period of time on the topic view is selected by an operator or not in order to decide a period of time for displaying a user-objects view. If the judgment is positive, the system proceeds to step 310. Meanwhile, if the judgment is negative, the system proceeds to step 311.

An embodiment of selecting a period of time on the topic view will be explained below by referring to FIG. 6A.

With reference now again to FIG. 6A, FIG. 6A illustrates an embodiment of selecting a period of time on the topic view.

The topic view (603) shows that the period of time from Apr. 18, 2016, to Apr. 19, 2016 is now selected by the operator. The selection may be done, for example, but not limited to, using icons (611 and 612), inputting, touching, or selecting a period of time; or selecting a period of time, for example, using a calendar.

With reference now back to FIG. 3B, in step 310, the system dynamically displays, for a selected period of time (or a designated period of time) and for each topic, user objects assigned according to a degree of involvement of a user with a topic in a user-object's window, using the analysis results.

The user objects may be displayed by, for example, but not limited to, an icon. Each of the user objects may be different, depending on the degree of involvement of a user with a topic and to the information on a user group. For example, a size, a shape, a color or a combination of these of user objects may be different, depending on the degree of involvement of a user with a topic and to the information on a user group.

In step 311, the system dynamically displays, for a predefined period of time (or a designated period of time) and for each topic, user objects assigned according to a degree of involvement of a user with a topic in a user-object's window, using the analysis results.

Figure 6B:
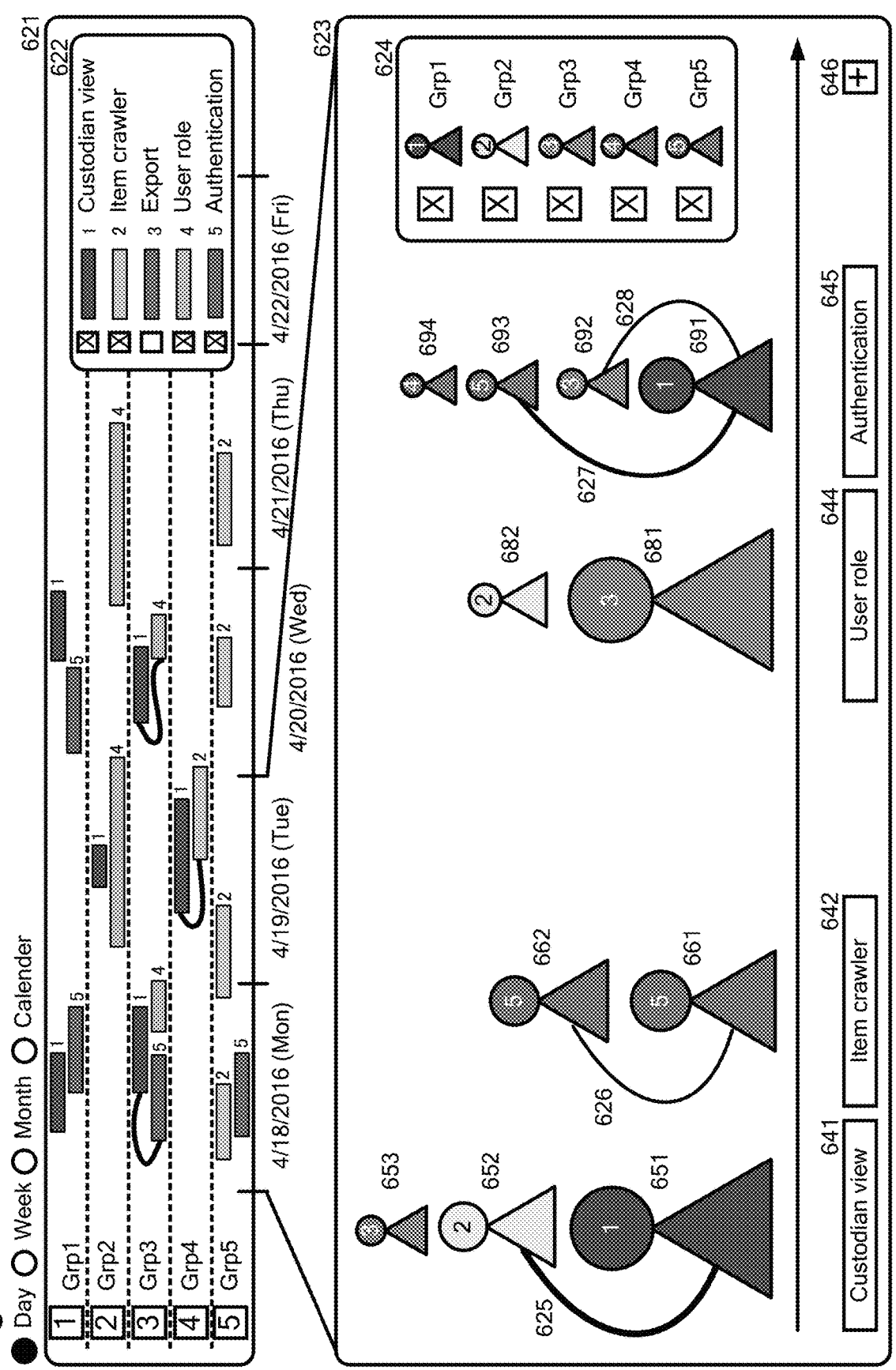
FIG. 6B illustrates an embodiment of a user-objects view and a communication volume object in the user-objects view together with the topic view.
Figure 6C:
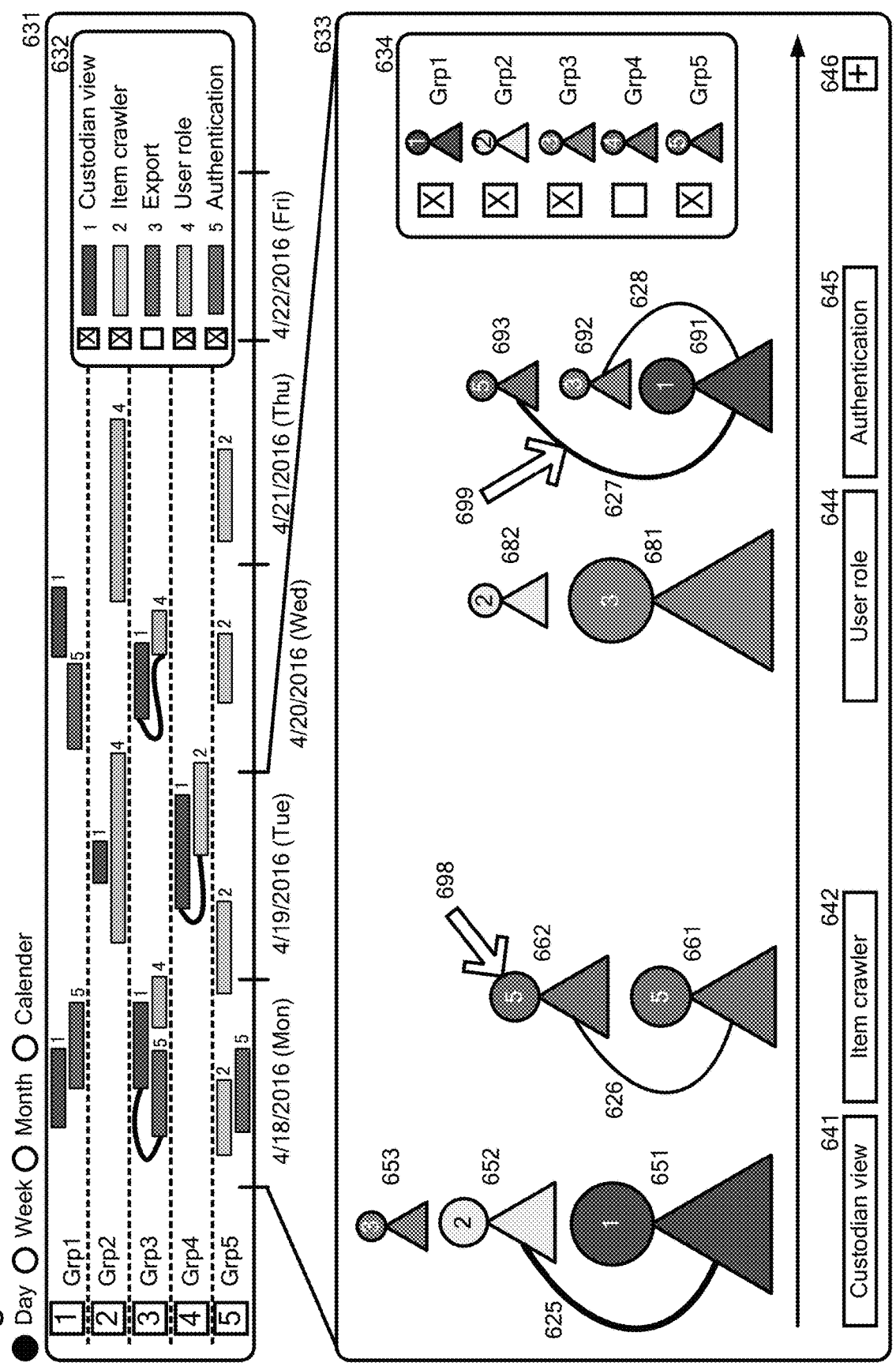
FIG. 6C illustrates an embodiment of a filtering selection of a user group from the user-objects view.

An embodiment of the user-object's window displayed in step 311 is explained as that of the user-object's window (623) described in FIG. 6B. The user-object's window (623) is the same as that described in FIG. 5B (see 523). Accordingly, the overlapping explanations of the user-object's window (623) will be omitted here.

Step 312 corresponds to step 212 described in FIG. 2B. Accordingly, the overlapping explanations of step 312 will be omitted here.

Figure 3C:
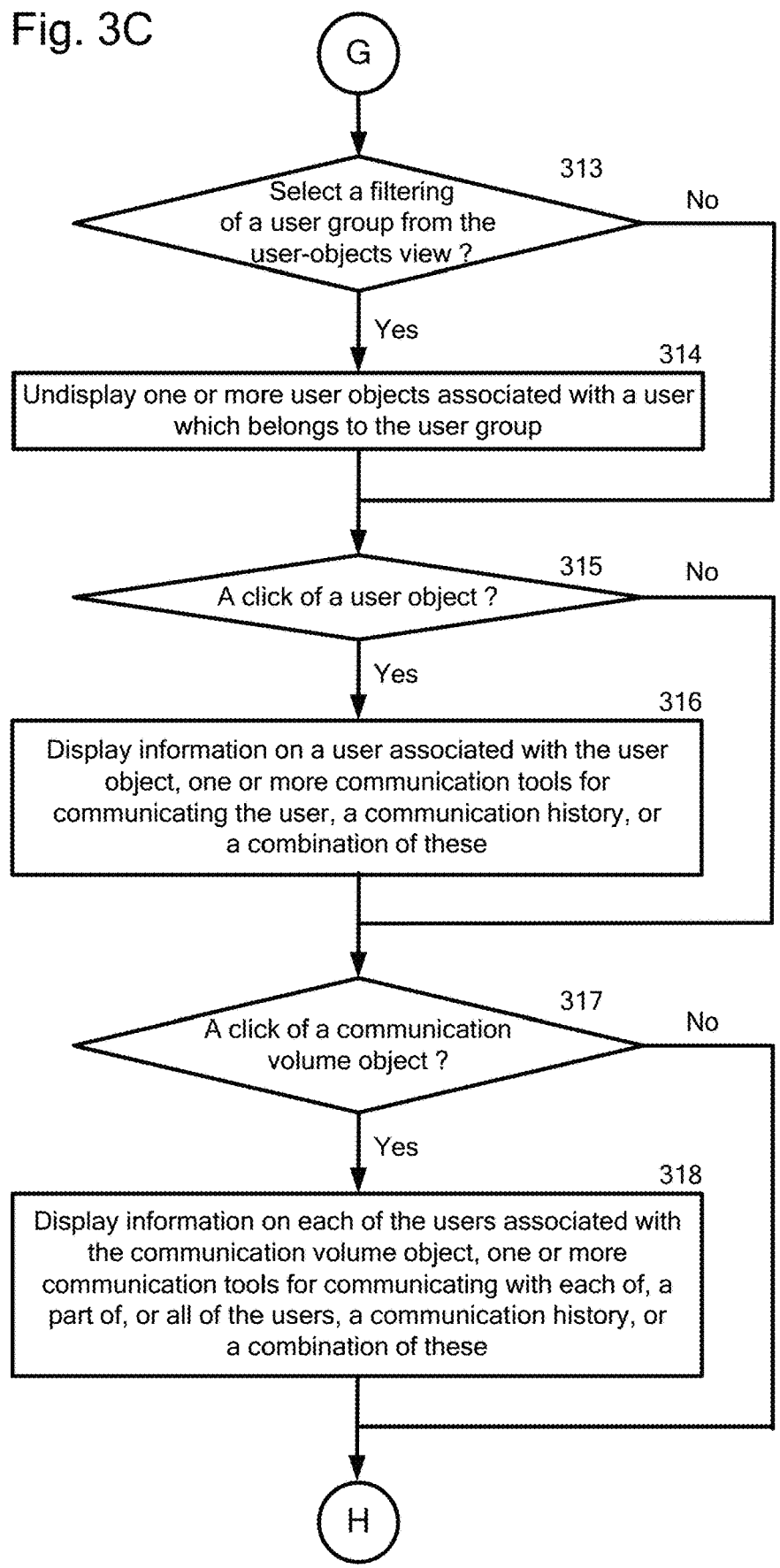

With reference now back to FIG. 3C, steps 313 to 318 correspond to steps 213 to 218 described in FIG. 2C, respectively. Accordingly, the overlapping explanations of steps 313 to 318 will be omitted here.

Figure 3D:
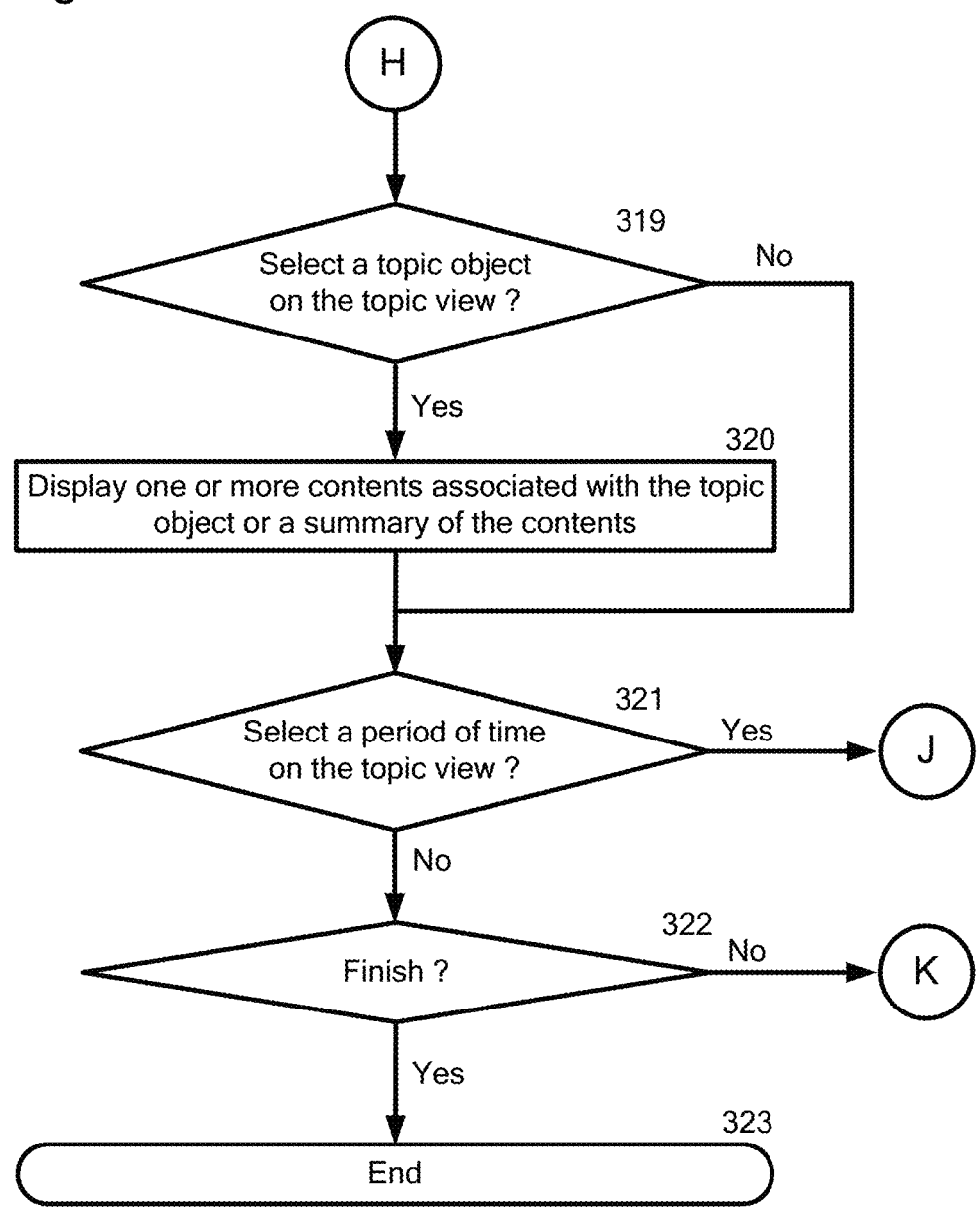

With reference now to FIG. 3D, in step 319, the system judges whether a topic object on the topic view is selected or not. If the judgment is positive, the system proceeds to step 319. Meanwhile, if the judgment is negative, the system proceeds to step 320.

In step 320, the system displays one or more contents associated with the topic object or a summary of the contents.

The content associated with the topic object may be, for example, but not limited to, a whole or part of the content which was read into the memory in step 202 or step 302, The system may highlight one or more keywords in the topic, a name of a user(s) who relates to a topic associated with the topic object, a time-related representation, or a representation which relates to a degree of secrecy, urgency degree, seriousness or importance degree, or a combination of these.

The summary of the content may be generated so as to include one or more keywords in the topic, a name of a user(s) who relates to a topic associated with the topic object, a time-related representation, or a representation which relates to a degree of secrecy, urgency degree, seriousness or importance degree, or a combination of these.

In step 321, the system judges whether a period of time on the topic view is selected by the operator or not in order to decide a period of time for displaying a user-objects view. If the judgment is positive, the system proceeds back to step 310. Meanwhile, if the judgment is negative, the system proceeds to step 322.

In step 322, the system judges whether the process is terminated or not. If the judgment is positive, the system proceeds to a final step 323. Meanwhile, if the judgment is negative, the system proceeds back to step 307.

In step 323, the system terminates the process mentioned above.

Figure 9:
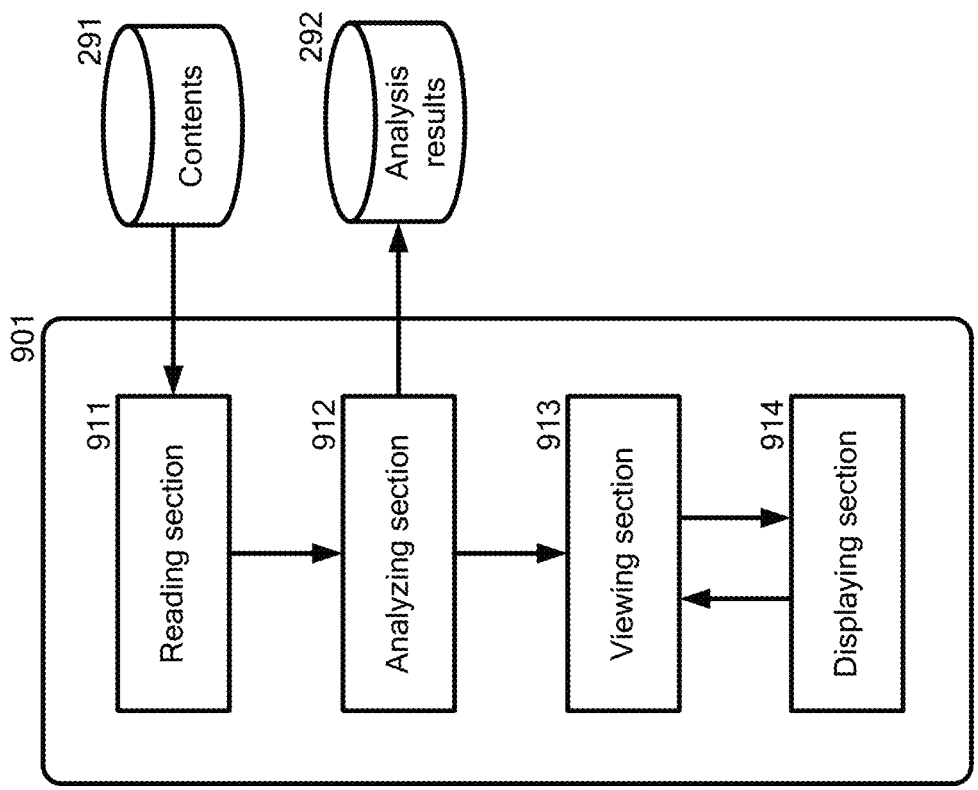
FIG. 9 illustrates an embodiment of an overall functional block diagram of a system hardware used in accordance with the embodiment of the overall flowchart described in FIGS. 2A to 2D and FIGS. 3A to 3D.

With reference now to FIG. 9, FIG. 9 illustrates an embodiment of an overall functional block diagram of a system hardware used in accordance with the embodiment of the overall flowchart described in FIGS. 2A to 2D and FIGS. 3A to 3D.

The system (901) may correspond to the computer (101) described in FIG. 1.

The system (901) comprises a reading section (911), an analyzing section (912), a viewing section (913) and a displaying section (914).

The reading section (911) may read, into a memory, contents collected from various kinds of communication tools The reading section (911) may perform step 202 described in FIG. 2A.

The reading section (911) may perform step 302 described in FIG. 3A.

The analyzing section (912) may analyze the contents to obtain analysis results.

The analyzing section (912) may perform step 203 described in FIG. 2A.

The analyzing section (912) may perform step 303 described in FIG. 3A.

The viewing section (913) may display, for a designated period of time, a graph view which shows the amount of change in communication, using the analysis results.

The viewing section (913) may display, for a designated period of time and for each user group, a topic view which shows a topic object indicating on which topic the communication was made. The viewing section (913) may undisplay a topic object associated with the topic, according to a filtering selection of the topic. The viewing section (913) may display a co-occurrence object which shows the co-occurrence relation in a case where there is a co-occurrence relation between topics in one user group. The viewing section (913) may display one or more contents associated with the topic object or summary of the contents in a response to selection of the topic object.

The viewing section (913) may perform steps 204 described in FIG. 2A and step 221 described in FIG. 2D.

The viewing section (913) may perform steps 305 and 306 described in FIG. 3A, steps 307 and step 308 described in FIG. 3B, and step 321 described in FIG. 3D.

The displaying section (914) may dynamically display, for a designated period of time and for each topic, user objects assigned according to the degree of involvement, using the analysis results.

The displaying section (914) may further display, between the user objects associated with users, a communication volume object which represents a communication volume between these users.

The displaying section (914) may further display information on each of the users associated with the communication volume object, one or more communication tools for communicating with each of, a part of or all of the users, a communication history of the user, a communication history between or among the users, or a combination of these in response to a click, hover or touch on the communication volume object, information on each of the users associated with the communication volume object.

The displaying section (914) may undisplay one or more user objects associated with a user which belongs to the user group, according to a filtering selection of a user group.

The displaying section (914) may further display one or more communication tools for communicating with the user, a communication history of the user, a communication history between the user and another user or among the user and other users, or a combination of these in response to a click, hover or touch on the user object, information on a user associated with the user object.

The displaying section (914) may perform steps 209 to 212 described in FIG. 2B and steps 213 to 218 described in FIG. 2C.

The displaying section (914) may perform steps 309 to 312 described in FIG. 3B and step 313 to 318 described in FIG. 3C.

According to an embodiment of the present invention, it can be possible to figure out status of a group member horizontally, not depending on one communication tools.

According to an embodiment of the present invention, it can be possible to obtain more important information from various kinds of communication tools.

According to an embodiment of the present invention, it can be possible to obtain more important information by selecting a time of period, a topic, a group or a combination of these.

According to an embodiment of the present invention, it can be possible to obtain information on communicating another people or other peoples to see a list of communication tools which are already prioritized.

According to an embodiment of the present invention, it can be possible to know a trending topic(s) or the hottest topic.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information on the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

The invention claimed is:

1. A method for visualizing analysis results of contents, the method comprising:
    collecting contents from communication tools using an agent program to protect privacy, wherein the communication tools allow a user to communicate with one or more users;
    extracting metadata from the contents, wherein the extracted metadata comprises one or more of the following: an originator, a viewer, a task identifier, a data, a reply to and tags;
    analyzing the contents and the extracted metadata to obtain analysis results, wherein the analysis results comprise one or more of the following: information on user groups, information on topics and degrees of involvement of users with the topic; and
    displaying for a designated period of time a graph view which shows an amount of change in communication using the analysis results.

2. The method as recited in claim 1 further comprising:
    calculating degrees of involvement of users with the topic based on a total number of contents with which a user has an involvement.

3. The method as recited in claim 2 further comprising:
    dynamically displaying, for a period of time selected on the graph view by an operator as well as for each topic, user objects assigned according to the degree of involvement of a user with a topic in a user-object's window.

4. The method as recited in claim 3 further comprising:
    dynamically displaying, for a predefined period of time and for each topic, user objects assigned according to the degree of involvement of the user with the topic in the user's objects window in response to the operator not selecting the period of time on the graph view.

5. The method as recited in claim 4 further comprising:
displaying between the user objects associated with the users, a communication volume object which represents a communication volume between users on a topic.

6. The method as recited in claim 5 further comprising:
calculating a historical performance of a communication tool using a total amount of user activities on the communication tool or responsiveness of the user activities on the communication tool.

7. The method as recited in claim 6, wherein, in response to a click, hover or touch on the communication volume object, information on each of the users associated with the communication volume object, one or more communication tools for communicating with each of, a part of or all of the users, a communication history of the user, a communication history between or among the users, or a combination of these is displayed.

8. The method as recited in claim 7, wherein the communication tools are prioritized to display.

9. The method as recited in claim 8, wherein the prioritization is made based on an availability of the communication tool by the user; a historical performance of using the communication tool by the user; one or more properties associated with the user; or a degree of secrecy, urgency degree, seriousness or importance degree, priority associated with the topic or a number of users who should be included.

10. The method as recited in claim 1 further comprising:
displaying, for a period of time and for each user group, a topic view which shows a topic object indicating on which topic a communication was made, wherein a topic object associated with the topic is undisplayed according to a filtering selection of the topic, wherein, in case where there is a co-occurrence relation between topics in one user group, a co-occurrence object which shows the co-occurrence relation is further displayed, wherein, in response to a selection of the topic object, one or more contents associated with the topic object or summary of the contents is displayed.

* * * * *